(12) United States Patent
Shimamoto et al.

(10) Patent No.: US 6,754,145 B1
(45) Date of Patent: Jun. 22, 2004

(54) TILT COMPENSATION DEVICE FOR DISK DRIVE

(75) Inventors: Masayoshi Shimamoto, Tokyo (JP); Kazuhiko Nakane, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,196

(22) Filed: Feb. 22, 2000

(30) Foreign Application Priority Data

Feb. 22, 1999 (JP) .............................. 11-042932
Apr. 2, 1999 (JP) .............................. 11-096055

(51) Int. Cl.⁷ .................................. G11B 7/00
(52) U.S. Cl. ................... 369/44.32; 369/44.34; 369/47.19; 369/118
(58) Field of Search .............. 369/44.32, 47.19, 369/118, 44.34, 53.19

(56) References Cited

U.S. PATENT DOCUMENTS

| | | | |
|---|---|---|---|
| 4,589,103 A | | 5/1986 | Tajima |
| 5,322,993 A | * | 6/1994 | Ohyama ............... 369/118 |
| 5,416,766 A | | 5/1995 | Horimai |
| 5,430,699 A | * | 7/1995 | Matsubara et al. ....... 369/44.32 |
| 5,502,698 A | * | 3/1996 | Mochizuki ............. 369/44.32 |
| 5,623,466 A | * | 4/1997 | Itonaga ............... 369/44.32 |
| 5,675,564 A | | 10/1997 | Muramatsu et al. |
| 5,848,045 A | * | 12/1998 | Kirino et al. .......... 369/116 |
| 5,867,474 A | | 2/1999 | Nagasawa et al. |
| 6,091,699 A | | 7/2000 | Nakane et al. |
| 6,115,334 A | * | 9/2000 | Tsutsui et al. ......... 369/44.32 |
| 6,320,830 B1 | * | 11/2001 | Tsukamoto et al. ...... 369/47.19 |
| 6,449,229 B1 | * | 9/2002 | Kim et al. ............ 369/53.19 |
| 6,545,958 B1 | * | 4/2003 | Hirai et al. ........... 369/44.32 |

FOREIGN PATENT DOCUMENTS

| | | |
|---|---|---|
| CN | 1134011 A | 10/1996 |
| DE | A1 19649970 | 6/1997 |
| EP | 0 886 266 | 12/1998 |
| GB | 2312320 | 10/1997 |
| JP | 09281669 A | 10/1997 |

* cited by examiner

*Primary Examiner*—Gautam R. Patel
(74) *Attorney, Agent, or Firm*—Birch, Stewart, Kolasch & Birch LLP

(57) ABSTRACT

In a disk drive for compensating the tilt between a disk including a first identification information area shifted radially outward by a predetermined distance from the center of a track, and a second identification information area shifted radially inward by the same distance, and a head for forming a light spot on the disk, there are provided a unit for determining a sum signal of an output signal from a photodetector obtained when the light spot traces the first identification information area and an output signal obtained when the light spot traces the second identification information area, and a tilt control unit for using the sum signal as an index to control the relative tilt between the disk and the head so as to cause the index to approach an extreme value.

21 Claims, 17 Drawing Sheets

TILT COMPENSATION DEVICE FOR DISK DRIVE

BACKGROUND OF THE INVENTION

The present invention relates to a disk drive which has a function of compensating a tilt (an inclination) between a disk which is a recording medium and a head from which a light beam is irradiated.

Recently, optical disks have attracted attention as a solution to meet demands for mediums for storing information more voluminous than conventional textual or audio information. On conventional erasable optical disks, guide grooves for use in control to keep a light beam for recording/reproduction on the track center are formed when the disks are manufactured. Because of the guide grooves, lands and grooves are formed on a disk in spiral or concentric form. By the use of both the lands and grooves as recording tracks (land tracks and groove tracks), recording twice as much information as that recorded by the use of either one as recording tracks can be realized. In addition, there is a method of connecting the lands and grooves so that the land tracks and groove tracks alternate every revolution of a disk to form a single spiral track, thereby improving the data access performance. This method is referred to as the single-spiral land/groove. (SS-L/G) recording format. An example of a disk drive using this method is described in Japanese Patent Application Kokai Publication No. 282669/1997.

According to the conventional disk format, recording tracks are divided in the track direction into sectors, and in the forefront of each sector, sector identification information, such as track number and sector number, is pre-formatted as pits which generate variation in physical shape or in local optical constants. Moreover, the sector format includes a first identification information area in which the sector identification information is disposed being displaced a predetermined distance in the radially outward direction from the center of the recording track, a second identification information area in which the sector identification information is disposed being displaced a predetermined distance in the radially inward direction from the center of the recording track, and a user information area which follows the sector identification information areas and in which user information and the like is recorded on the center of the recording tracks.

Next, a disk drive using an optical disk in which sector information is disposed as explained above will be described. FIG. 16 shows a track layout of the conventional optical disk. FIG. 17 is a block diagram showing the configuration of the disk drive for recording or reproducing information on such a kind of optical disks.

FIG. 16 shows the track layout of the conventional optical disk, the disposition of tracks and recording sectors in a zone, and the configuration of each recording sector. As shown in the drawing, the disk is in the SS-L/G recording format and comprises grooves and lands of identical width. That is, the width of grooves and lands is equal to the track pitch, and is a half of the interval between grooves.

In a recording track which includes an integer number of recording sectors, a sector identification information area (a sector identification signal part) in which sector identification information representing information for PLL pulling in, address information and the like is pre-formatted, is added to the forefront of each sector, and a user information area (an information recording part), in which user data and various management information are recordable, is disposed following the sector identification information part.

Moreover, the sector identification information area comprises two parts, that is, the front and rear parts as seen in the scanning direction, and is made of a first identification information area in which the sector identification information is disposed being displaced a predetermined distance in the radially outward direction from the center of the track and a second identification information area in which the sector identification information is disposed being displaced a predetermined distance in the radially inward direction from the center of the track.

An additional function is a track offset compensation. For optical disks of the sample servo method, a method is known which provides a pair of track offset detecting pits in the position displaced a predetermined distance to the right and left sides of the track center on the recording track so as to detect and compensate the tracking offset amount, as shown for example in the optical disk standard ISO/IFC 9171-1, 2 "130 mm Optical Disk Cartridge Write Once for Information Interchange,"1990.

When the light beam passes through the center of the pair of track offset detecting pits, the reproduced signal amplitudes of the pair of detecting pits are identical. If the light beam is offtrack, the reproduced signal amplitude of the pit in one side increases while that of the pit in the other side decreases. By detecting the track offset amount of the light beam, and applying compensation, it is possible to realize a control over the light beam so that it passes through the track center. This principle and effect can be applied to the SS-L/G recording format of the conventional drive.

Suppose that the light beam enters, from a user information area (a user signal area) in a certain groove recording sector, into a sector identification information area (a sector identification signal area) in the next groove recording sector. Since the forefront of the sector identification information area is shifted half the groove width to the outer (or inner) periphery of the disk, a corresponding tracking error signal is produced. After a while, the light beam reaches an identification signal part shifted half the groove width to the inner (or outer) periphery of the disk, and a corresponding tracking error signal is output. If these two error signals are detected in waveforms vertically symmetric with respect to a reference level (that is a tracking error level obtained when scanning the track center), the light beam is scanning the track center. Accordingly, the servo can be controlled to keep on the track center, by a comparison in size between tracking errors detected from the identification signal parts displaced to the inner and outer peripheries. Here, the order of disposition of the first and second identification information area is different depending on whether the track is a land or groove. That is, if in a land track the order of disposition is as the first identification information area and then the second identification information area, in a groove track the order is converse.

In this way, providing an SS-L/G recording disk with identification signals also makes it possible to improve a servo characteristic.

With reference to FIG. 17, the configuration of the conventional disk drive is as follows. In the drawing, reference numeral 10, denotes an optical disk, 11 denotes a semiconductor laser (LD) serving as a light source, 12 denotes a collimate lens, 13 denotes a beam splitter, 14 denotes an objective lens, 15 denotes a photodetector, 16 denotes an actuator, 17 denotes a differential amplifier, 18 denotes a difference signal waveform shaping unit, 19 denotes a reproduced difference signal processor, 20 denotes a polarity controller, 21 denotes a polarity reversing unit, 22 denotes a tracking controller, 23 denotes a summing amplifier, 24 denotes a sum signal waveform shaping unit, 25 denotes a reproduced signal processor, 26 denotes a polarity information reproduction unit, 27 denotes an address reproduction unit, 28 denotes an information reproduction unit, 29 denotes a system controller, 30 denotes a traverse controller, 31 denotes a traverse motor, 32 denotes a recording signal processor, 33 denotes a laser (LD) driver, and 34 denotes an actuator driver. The semiconductor laser 11, the collimate lens 12, the beam splitter 13, the objective lens 14, the photodetector 15, and the actuator 16 in combination constitute an optical head which is attached to a head base.

The operation of the conventional disk drive will be described according to the drawing. A laser beam output from the semiconductor laser 11 is collimated by the collimate lens 12, passes through the beam splitter 13, and then is focused onto the optical disk 10 by the objective lens 14. The laser beam reflected from the optical disk 10 contains recording track information, and passes through the objective lens 14, and then is launched onto the photodetector 15 by the beam splitter 13. The photodetector 15, comprising two light detecting parts split by a line extending in parallel with the track in the far-field formed by the reflected light for obtaining a push-pull signal, and two I-V converting units which are correspondent with the light detecting parts, converts the amounts of light detected by the respective light-detecting parts into electrical signals, and respectively supplies the signals to the differential amplifier 17 and the summing amplifier 23.

The differential amplifier 17 generates the push-pull signal by obtaining the difference between the input signals, and supplies the push-pull signal to the difference signal waveform shaping unit 18 and the polarity reversing unit 21. The difference signal waveform shaping unit 18 slices the analog push-pull signal output from the differential amplifier 17, at an appropriate level in order to convert the push-pull signal into a digital value, and supplies the binarized difference signal to the reproduced difference signal processor 19. The reproduced difference signal processor 19 determines the tracking polarity by extracting an identification signal from the binarized difference signal, and supplies a polarity detection signal to the polarity controller 20, the polarity information reproduction unit 26, the address reproduction unit 27, and the information reproduction unit 28.

Receiving the polarity detection signal from the reproduced difference signal processor 19 and a control signal from the system controller 29, the polarity controller 20 supplies a polarity setting signal and control hold signal to the polarity reversing unit 21 and tracking controller 22. The polarity reversing unit 21 judges, based on the control signal from the polarity controller 20, whether the accessed track is in a land or groove. For example, only if the track is judged as a land, the polarity of the output signal of the differential amplifier 17 is reversed, and the output signal is then supplied as a tracking error signal to the tracking controller 22. According to the level of the tracking error signal input by the polarity reversing unit 21, the tracking controller 22 supplies a tracking control signal to the actuator driver 34; the actuator driver 34 provides, according to the signal, a drive current to the actuator 16, and performs a position control over the objective lens 14 in the direction transverse to the recording track. Consequently, the light spot correctly scans the tracks.

At the summing amplifier 23, the output signals from the photodetector 15 are added, and the sum signal is supplied to the sum signal waveform shaping unit 24. The sum signal waveform shaping unit 24 performs, at a given threshold, data slice of a data signal and address signal in analog form so as to make the signals have pulse waveforms, and supplies them to the reproduced signal processor 25. The reproduced signal processor 25 reproduces an identification signal which contains address information and polarity information, from the binarized sum signal obtained by the waveform processing of the sum signal. The polarity information reproduction unit 26 extracts, from the identification signal, the polarity information which indicates the tracking polarity of the sector. The address reproduction unit 27 reproduces sector address information from the identification information. At the information reproduction unit 28, the binarized sum signal representing the user information recorded in the user information area on the disk is decoded and error-corrected, and is output as a reproduced information signal. In the information reproduction unit 28, an analysis of error correction information (for instance, the number of corrected errors and the like) obtained by the error correction or of a jitter enables determination of an data error rate. Generally, the system controller 29 determines the data error rate by reading the error correction information stored in the information reproduction unit 28 as necessary, and through calculation or using a lookup table.

The polarity information output from the polarity information reproduction unit 26 and the sector address information output from the address reproduction unit 27 are sent to the system controller 29, and are used for control over the tracking polarity or sample and hold operation in tracking control. In the configuration under consideration, in order to intercept unwanted disturbances to the tracking servo system, the tracking error signal may be sampled and held immediately before the sector identification information areas, and the tracking control may be kept off while the light beam traces the sector identification information areas. The system controller 29 to which information relating to the identification signals is input from the reproduced difference signal processor 19, polarity information reproduction unit 26, and address reproduction unit 27, supplies control signals to the polarity controller 20, traverse controller 30, LD driver 33, and recording signal processor 32.

The system controller 29 judges whether the light beam is on a desired address, on the basis of information about the identification signals containing address from the address reproduction unit 27 and the like. The traverse controller 30 moves the optical head to a target track, by supplying a drive current to the traverse motor 31, according to the control signal from the system controller 29. At the same time, the tracking controller 22 interrupts the tracking control operation by the control signal from the system controller 29. In normal reproduction, the system controller 29 drives the traverse motor 31 via the traverse controller 30 according to the tracking error signal input from the tracking controller 22, and gradually moves the optical head in the radial direction along with the reproduction.

At the recording signal processor 32, the error correction code is added to the recording data input in recording, and the coded recording signal obtained by the addition of the error correction code is supplied to the LD driver 33. When the system controller 29 sets the LD driver 33 to the recording mode by using the control signal, the LD driver 33 modulates the drive current applied to the semiconductor laser 11 according to the recording signal. The intensity of the light spot irradiated onto the optical disk 10 is thereby varied according to the recording signal, and recording pits are thereby formed. On the one hand, in reproduction, the LD driver 33 is set to the reproduction mode by the control signal from the system controller 29, and controls the drive current so that the semiconductor laser 11 emits light at a constant intensity. In this way, it is possible to detect recording pits and pre-pits on the recording tracks.

In the conventional disk drive in the configuration described above, tracking errors on an optical disk with guide grooves, such as an SS-L/G recording disk, are usually detected by the push-pull method. It is known however that this method in principle is associated with a detected tracking error signal having a waveform vertically asymmetric with respect to a reference level (hereinafter referred to as an optical offset) because of a tilt, even if the light beam is scanning the track center. That is, the effect of the tilt is equivalent to superimposition of an electrical offset on the tracking error signal.

If the optical offset is processed by being regarded as the same as the electrical offset, that is, if an offset which makes the optical offset zero is electrically superimposed for compensation, the light beam runs off the track center (a detrack state), and the reliability in the signal detection is lowered. Specifically, the quality of the signal is degraded (lower S/N), because of a crosserase between adjacent tracks in recording, a poor erasing in overwrite, a crosstalk from an adjacent track in reproduction, and the like. Moreover, the quality of a reproduced signal is deteriorated by an optical aberration caused by the tilt. These problems might be an obstacle to reduction in track pitches as a means for improving the recording density.

To solve the problems, a conventional disk drive uses a method in which the detrack is compensated by utilizing the disk format in which the sector identification information is disposed in a staggered manner in the outer and inner directions with respect to the track center by a certain distance. By the method, the detrack is compensated so that the absolute value of the difference between the tracking error signal and reference level (the level of the tracking error signal obtained when scanning the track center) when the first identification information is being reproduced, and the absolute value of the difference between the tracking error signal and reference level when the second identification information is being reproduced are the same. The method is effective when the detrack is generated by only one cause.

However, in drives practically used, there are other causes of vertically asymmetric tracking error signals, for example, offsets in electrical circuits (hereinafter referred to as electrical offsets for differentiating from the optical offsets), lack of gain balance of an optical system or electrical circuits, and the like. In a broad interpretation, these are regarded as offsets superimposed on tracking error signals.

On this point, the conventional disk drive has a problem that a tilt and detrack cannot be optimally compensated based only on a reflected light from a disk. For this reason, as a method for compensating tilts, an optical tilt detector is additionally provided onto the optical head, and is utilized. By this method, while only tilts can be separately compensated, the optical tilt detector is additionally necessary. Therefore, a problem of inevitable increase in the cost of the drive comes about.

As another method for compensating tilts without the optical tilt detector, the use of a combination of a conventional detrack index and other indexes, such as a jitter and reproduction error rate of a reproduced signal and the like, can be conceived.

In this method, however, there is a problem that tilt and detrack compensation cannot be converged or takes a long time for the convergence, because a tilt compensation through repetitive estimation using a plurality of parameters is needed because the jitter and error rate vary depending upon both the tilt and detrack.

Moreover, methods which adopt a new signal processing method have been studied. In other words, methods by which the detected error rate is lower than in the earlier method have been studied. One of them is the maximum likelihood estimation, for instance, the Viterbi detection known as a detection method which is more defensive against deterioration in the quality of signals than a conventional detection performed bit by bit. This method, however, needs addition of a new configuration to the conventional signal detection system, and increase in the cost of the drive is thereby inevitable.

SUMMARY OF THE INVENTION

The invention seeks to solve the problems, and has an object of obtaining a disk drive which can compensate tilts without increase in the cost of the drive and can separately compensate only tilts without influence from the detrack compensation.

According to the invention, the disk drive for compensating the tilt between a disk including a first identification information area shifted radially outward by a predetermined distance from the center of a track, and a second identification information area shifted radially inward by the same distance, and a head for forming a light spot on the disk, comprises a photodetector for detecting light reflected at the light spot, means for determining a sum signal of an output signal from the photodetector obtained when the light spot traces the first identification information area and an output signal obtained when the light spot traces the second identification information area, and tilt control means for using the sum signal as an index to control the relative tilt between the disk and the head so as to cause the index to approach an extreme value.

According to the invention, the disk drive uses a sum signal of a sum signal amplitude from the photodetector obtained when the light spot traces the first identification information area, and a sum signal amplitude obtained when the light spot traces the second identification information area, as the index.

According to the invention, the disk drive uses a sum signal of a difference signal amplitude from the photodetector obtained when the light spot traces the first identification information area, and a difference signal amplitude obtained when the light spot traces the second identification information area, as the index.

According to the invention, the disk drive uses a sum signal of an absolute value of a difference between an envelope of a difference signal from the photodetector obtained when the light spot traces the first identification information area and a reference level, and an absolute value of a difference between an envelope of a difference signal obtained when the light spot traces the second identification information area and a reference level, as the index.

According to the invention, the disk drive for compensating the tilt between a disk including a first identification information area shifted radially outward by a predetermined distance from the center of a track, and a second identification information area shifted radially inward by the same distance, and a head for forming a light spot on the disk, comprises a photodetector for detecting light reflected at the light spot, means for determining a difference signal or an absolute value of the difference signal of an output signal from the photodetector obtained when the light spot traces the first identification information area and an output signal obtained when the light spot traces the second identification information area, and tilt control means for using the difference signal or an absolute value of the difference signal as an index to control the relative tilt between the disk and the head so as to cause the index to approach an extreme value.

According to the invention, the disk drive uses a difference signal or an absolute value of the difference signal of an envelope of the difference signal from the photodetector obtained when the light spot traces the first identification information area, and an envelope of a difference signal obtained when the light spot traces the second identification information area, as the index.

DETAILED DESCRIPTION OF THE PREFERRED EMBODIMENTS

Embodiment 1

Figure 17:
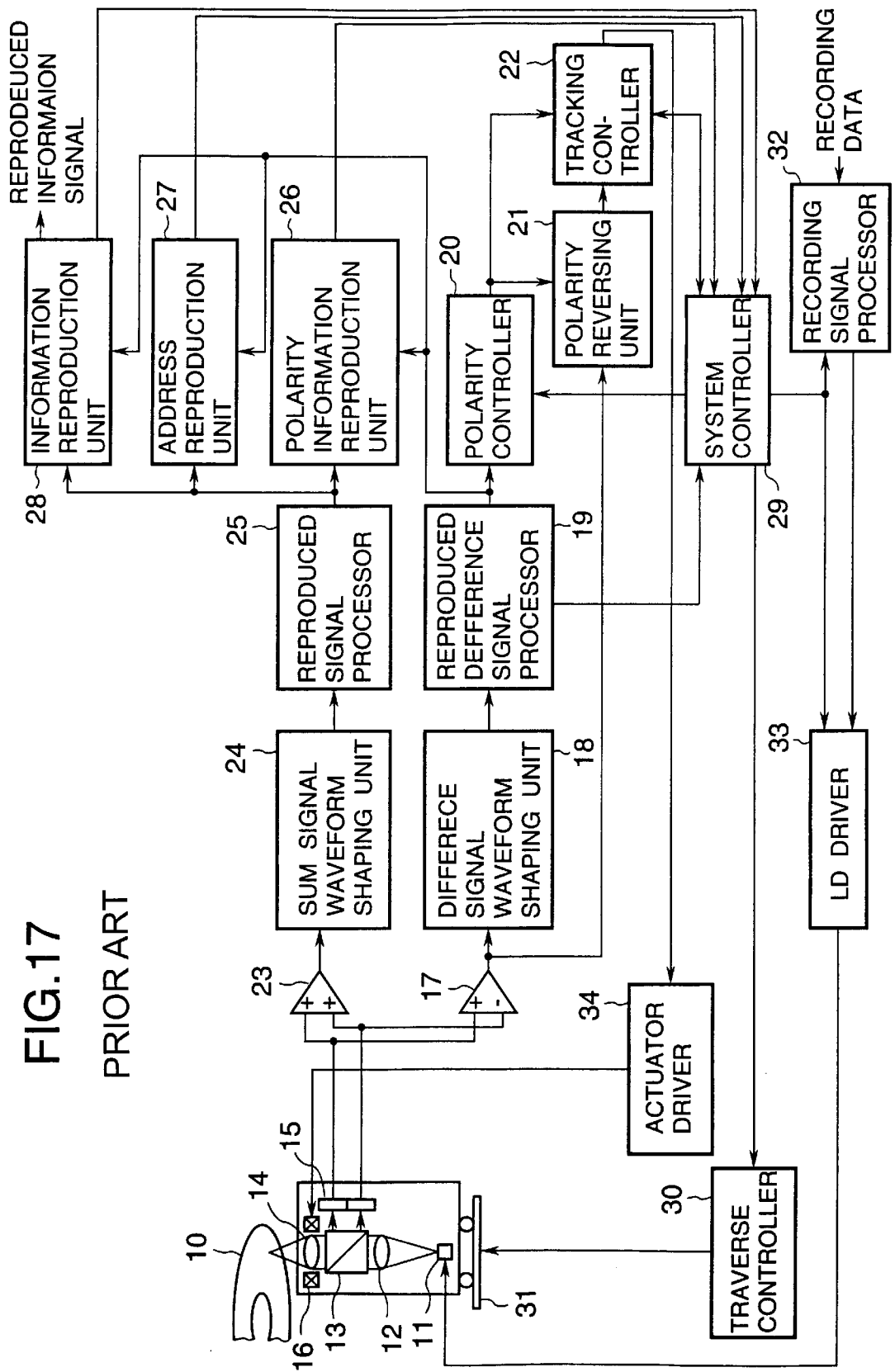
FIG. 17 is a block diagram showing a conventional disk drive.

The invention will be described in detail, with reference to drawings showing embodiments of the invention. However, a detailed description of blocks identically numbered as the prior art is omitted, because the blocks are basically the same as those in a disk drive shown in FIG. 17.

Figure 1:
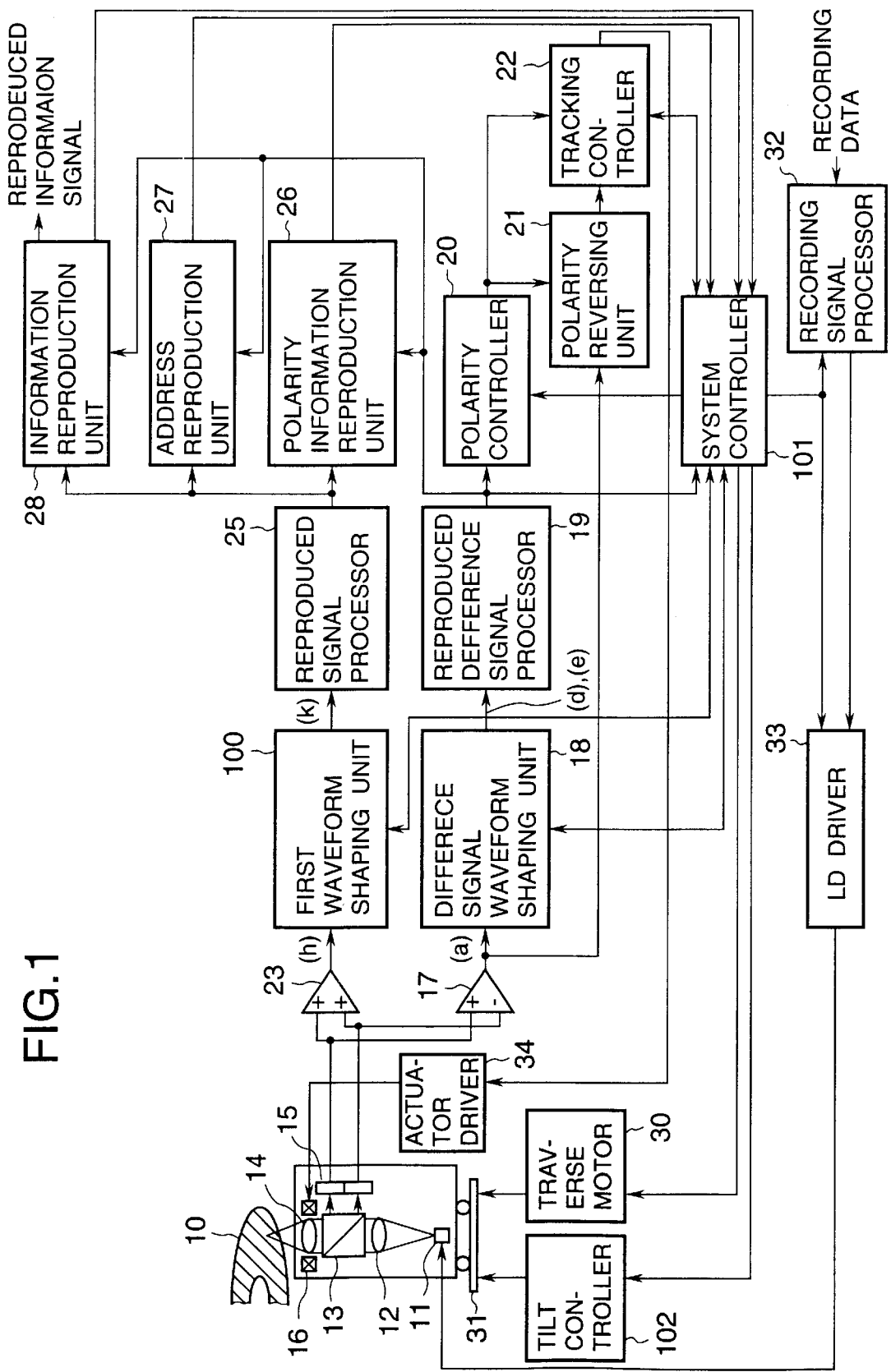
FIG. 1 is a block diagram showing a disk drive of Embodiment 1 of the invention.

FIG. 1 is a diagram showing a disk drive of Embodiment 1 of the invention. In the drawing, reference numeral 10 denotes an optical disk, 11 denotes a semiconductor laser (LD) serving as a light source, 12 denotes a collimate lens, 13 denotes a beam splitter, 14 denotes an objective lens, 15 denotes a photodetector, 16 denotes an actuator, 17 denotes a differential amplifier, 18 denotes a difference signal waveform shaping unit, 19 denotes a reproduced difference signal processor, 20 denotes a polarity controller, 21 denotes a polarity reversing unit, 22 denotes a tracking controller, 23 denotes a summing amplifier, 25 denotes a reproduced signal processor, 26 denotes a polarity information reproduction unit, 27 denotes an address reproduction unit, 28 denotes an information reproduction unit, 30 denotes a traverse controller, 31 denotes a traverse motor, 32 denotes a recording signal processor, 33 denotes a laser (LD) driver, and 34 denotes an actuator driver. Their functions are the same as or equivalent to those in the description of the prior art. The semiconductor laser 11, the collimate lens 12, the beam splitter 13, the objective lens 14, the photodetector 15 and the actuator 16 in combination constitute an optical head, which is attached to a head base.

Additionally, 100 denotes a first waveform shaping unit, 101 denotes a system controller and 102 denotes a tilt controller.

Figure 2:
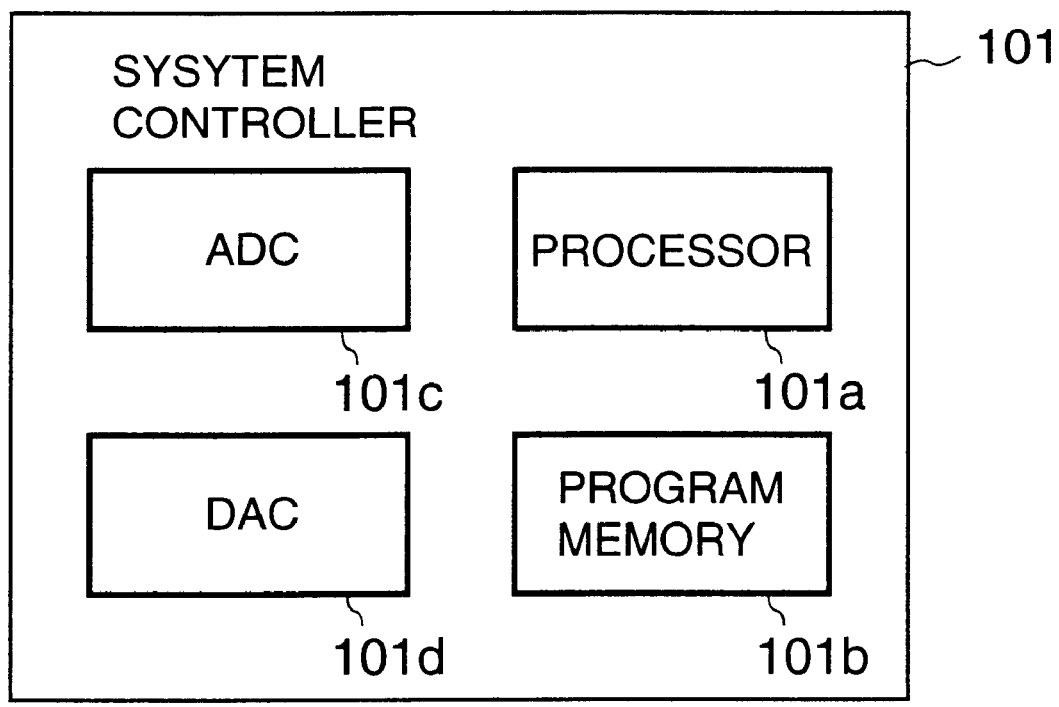
FIG. 2 is a block diagram showing the details of the system controller in FIG. 1.

As illustrated in FIG. 2, the system controller 101 comprises a processor such as a digital signal processor (DSP) 101a and a program memory 101b, and operates in accordance with the programs stored in the program memory 101b. The system controller 101 also comprises an ADC (analog-to-digital converter) 101c and a DAC (digital-to-analog converter) 101d, which perform AD and DC conversion when analog signals are input or output.

Operations in reproduction from the optical disk shown in FIG. 16 by the disk drive of the embodiment with the configuration described above are described with reference to FIG. 1 and FIG. 3A to FIG. 3I, which show waveforms of the respective units in FIG. 1.

A laser beam output from the semiconductor laser 11 is collimated by the collimate lens 12, passes through the beam splitter 13, and then is focused onto the optical disk 10 by the objective lens 14. The laser beam reflected from the optical disk 10 contains recording track information, and passes through the objective lens 14, and then is launched onto the photodetector 15 by the beam splitter 13. The photodetector 15, comprising two light detecting parts split by a line extending in parallel with the track in the far-field formed by the reflected light for obtaining a push-pull signal, and two I-V converting units which are correspondent with the light detecting parts, converts the amounts of light detected by the respective light-detecting parts into electrical signals, and respectively supplies the signals to the differential amplifier 17 and the summing amplifier 23.

Figure 3:
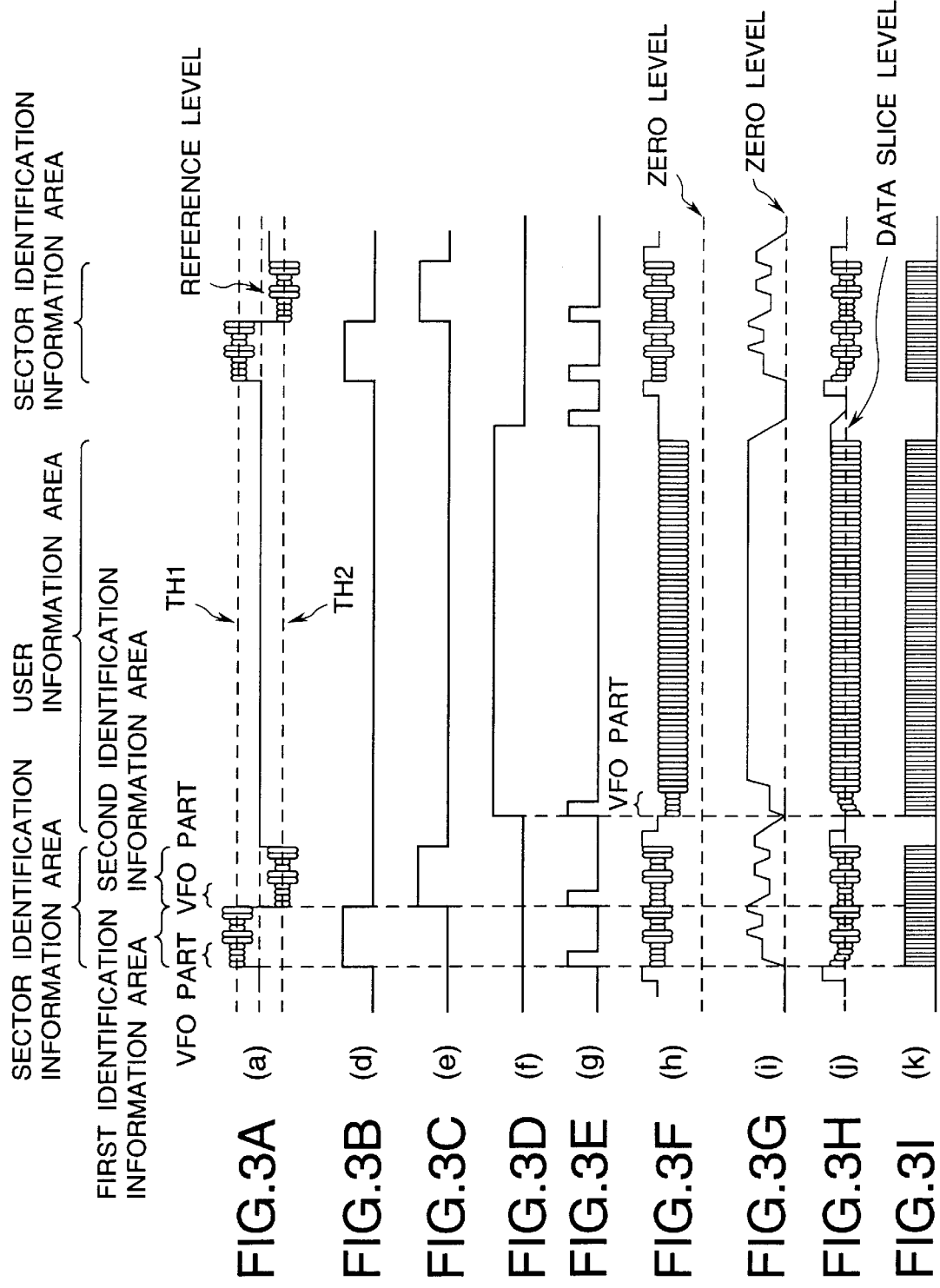
FIG. 3A to FIG. 3I show waveforms output from blocks which form the disk drive of Embodiment 1.

The differential amplifier 17 generates a push-pull signal shown as (a) in FIG. 3A by obtaining the difference between the input signals, and supplies the push-pull signal to the difference signal waveform shaping unit 18 and the polarity reversing unit 21. The difference signal wave form shaping unit 18 slices the analog push-pull signal output from the differential amplifier 17 at two appropriate levels (TH1, TH2) shown as (a) in FIG. 3A to convert the push-pull signal into digital values shown as (d) and (e) in FIG. 3B and FIG. 3C, and supplies the binarized difference signals to the reproduced difference signal processor 19. The waveform (d) indicates the position of the first identification information area, and (e) indicates the position of the second identification information area. There produced difference signal processor 19 judges the tracking polarity by the timings at which the binarized difference signals (d) and (e)

appear, and supplies a polarity detection signal to the polarity controller 20, polarity information reproduction unit 26, address reproduction unit 27, information reproduction unit 28 and system controller 101. Additionally, the reproduced difference signal processor 19 supplies the digital values shown as (d) and (e) in FIG. 3B and FIG. 3C to the system controller 101.

Receiving the polarity detection signal from the reproduced difference signal processor 19 and a control signal from the system controller 101, the polarity controller 20 supplies a polarity setting signal to the polarity reversing unit 21 and a control hold signal for defect control to the tracking controller 22. According to the polarity setting signal from the polarity controller 20, the polarity reversing unit 21 supplies the tracking controller 22 with the output of the differential amplifier 17, as the tracking error signal, with the polarity reversed only when the track being accessed is on a land for example. According to the level of the tracking error signal from the polarity reversing unit 21, the tracking controller 22 supplies a tracking control signal to the actuator driver 34; the actuator driver 34 provides, according to this signal, a drive current to the actuator 16, and performs a position control over the objective lens 14 in the direction transverse to the recording track. Consequently, the light spot under tracking control correctly scans the tracks.

At the summing amplifier 23, the output signals from the photodetector 15 are added, and the sum signal shown as (h) in FIG. 3F is supplied to the first waveform shaping unit 100. The first waveform shaping unit 100 performs a certain processing on the analog sum signal, then performs a data slicing at a given threshold so as to generate a pulse waveform shown as (k) in FIG. 3I, and supplies it to the reproduced signal processor 25. The operations following the reproduced signal processor 25 are identical to those in the prior art, and their description therefore is omitted.

Figure 4:
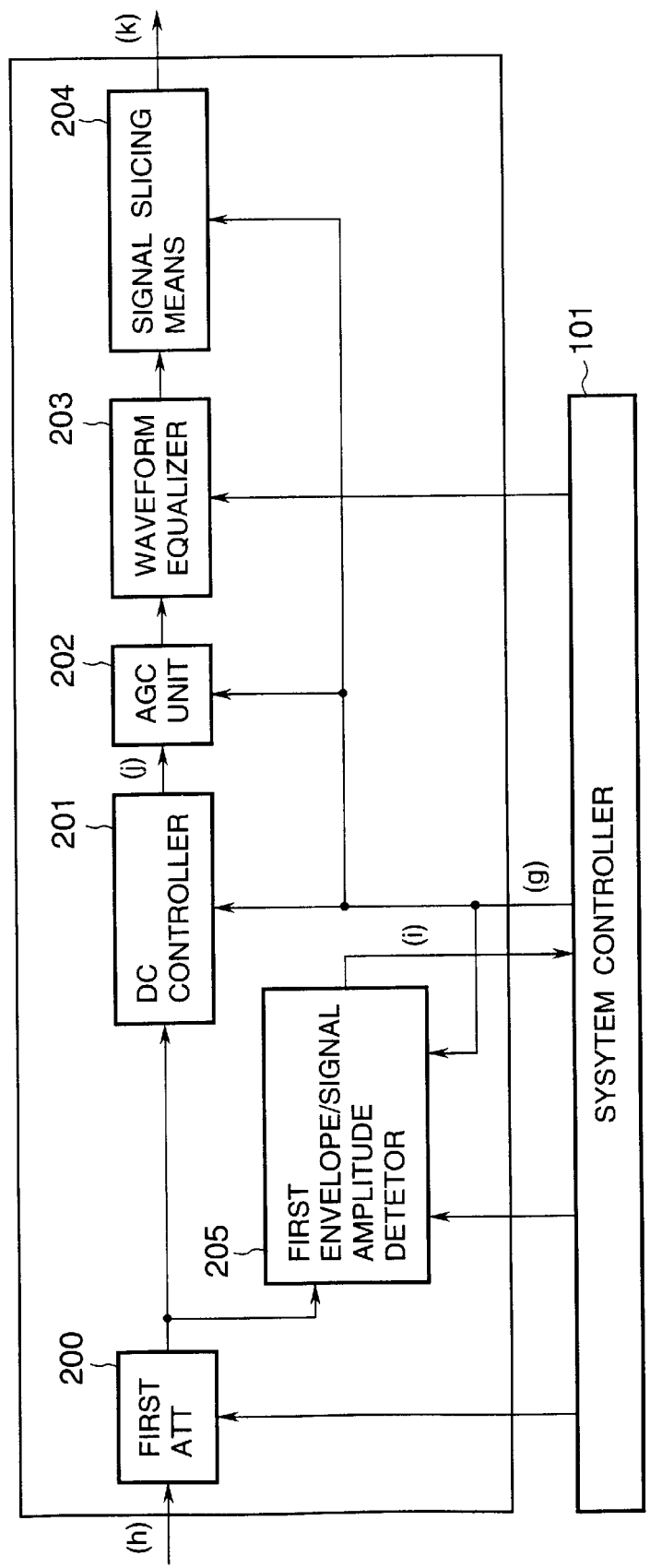
FIG. 4 is a block diagram showing a first waveform shaping unit which constitutes the disk drive of Embodiment 1.

The configuration and operation of the first waveform shaping unit 100 is described with reference to FIG. 4. In the drawing, reference numeral 200 denotes a first ATT (attenuator), 201 denotes a DC controller, 202 denotes an AGC (automatic gain control) unit, 203 denotes a waveform equalizer, 204 denotes a signal slicing means, and 205 denotes a first envelope/signal amplitude detector.

The reproduction level of the sum signal, shown as (h) in FIG. 3F, input from the summing amplifier 23, is adjusted by a certain gain at the first ATT 200. The gain of the first ATT 200 is set by a control signal from the system controller 101. That is, the system controller 101 determines optimum gain setting of the first ATT 200 according to amplitude information of an output signal of the first ATT 200. The value of the gain is set at the first ATT 200 so that an adequate detection resolution of the first envelope/signal amplitude detector 205 is provided and the quality of the reproduced signals in the units following the DC controller 201 is maintained.

The sum signal, of which the gain has been adjusted at the first ATT 200 is input to the DC controller 201, and where the DC component is removed so that the waveform will be as shown as (j) in FIG. 3H. The DC controller 201 removes DC components which are not necessary for data reproduction for fully utilizing the dynamic range of the AGC 202 in the subsequent stage. However, in an area that the DC component abruptly varies, such as a boundary between the sector identification information area and user information area, and in an area where signals are discontinuous, a large sag appears in the output of the DC controller 201. Accordingly, the DC controller 201 has a function of reducing time constants for eliminating the DC component by boost control gate signals, shown as (g) in FIG. 3E, input by the system controller 101, and of shortly catching up with the DC variation in the input signal. The boost control gate signal is a pulse with a predetermined temporal width generated by the system controller 101. The boost control gate signal rises at the starting points of the first and second identification information areas, indicated as leading edges of the respective signals shown as (d) and (e) in FIG. 3B and FIG. 3C, which are input from the reproduced difference signal processor 19, and at the starting and ending points of the user information area, indicated as a leading edge or trailing edge of the signal shown as (f) in FIG. 3D, which is detected according to the address signal (being reproduced at the address reproduction unit 27) included in the sector identification information area. Additionally, where the DC level varies because of defects and the like, by outputting the boost control gate signal starting at the time point when the defective area ends, the time lag until data are detected normally after the termination of the defect may be reduced.

The waveform (j) of the output from the DC controller 201 is finely adjusted to have a predetermined signal amplitude at the AGC unit 202. The AGC unit 202 constitutes a feedback control system which monitors the signal amplitude of the input signal and controls its own gain to keep the output signal level at a predetermined amplitude. Accordingly, amplitude information of the input signal, that is, the output signal of the first ATT 200, can be extracted from the AGC unit 202.

The output signal of the AGC unit 202 is fed to the waveform equalizer 203, where a waveform distortion caused by the frequency response of the optical system is improved, and then binarized at the signal slicing means 204 as shown as (k) in FIG. 3I, and is then supplied to the reproduced signal processor 25. An optimum adaptive control is performed over the slice level of the signal slicing means 204 so as to minimize reproduction errors. Moreover, the signal slicing means 204, like the DC controller 201, has a boosting function in order to reduce the time constants for slice level control, according to the boost control gate signal from the system controller 101, and to follow the variation of the input signal in a short time.

At the first envelope/signal amplitude detector 205, respective envelopes in the upper and lower sides of the output signal of the first ATT 200, and the signal amplitude are detected, and then are supplied to the system controller 101 ((i) in FIG. 3G). These signals are used as indexes for tilt compensation, which will be described later.

In the operations described so far, the tilt compensation has not been performed, so that the quality of the reproduced signal, that is, the reliability of the data to which an error correction has been applied may not be acceptable. For this reason, immediately after the setting of the optical disk 10 or when the reliability of the reproduced data is deteriorated by the variation with the passage of time, it is desirable that the tilt compensation be performed for keeping adequate operating margin of the drive and improving the reliability of the reproduced data. The quality of the signal can be determined, when the jitter of the reproduced signal binarized at the signal slicing means 204 or the number of the error corrections (the data error rate), determined as a result of the processing of the information reproduction unit 28 in the subsequent stage, is fed into the system controller 101 and is processed therein by calculation or with reference to a lookup table.

A feature of the present embodiment is that the sum of the amplitude of the signal which is output from the summing amplifier 23 during reproduction of the first identification information area which forms the sector identification information area, and the amplitude of the signal which is output from the summing amplifier 23 during reproduction of the second identification information area which also forms the sector identification information area, is used as an index (hereinafter referred to as a first index) for judging the amount of a tilt between an optical disk and optical head. That is, the first index is determined by the system controller 101 by performing operations on signal amplitude information acquired from the first envelope/signal amplitude detector 205, using the ADC 101c provided in the system controller 101 during reproduction from the first and second identification information areas.

Figure 5:
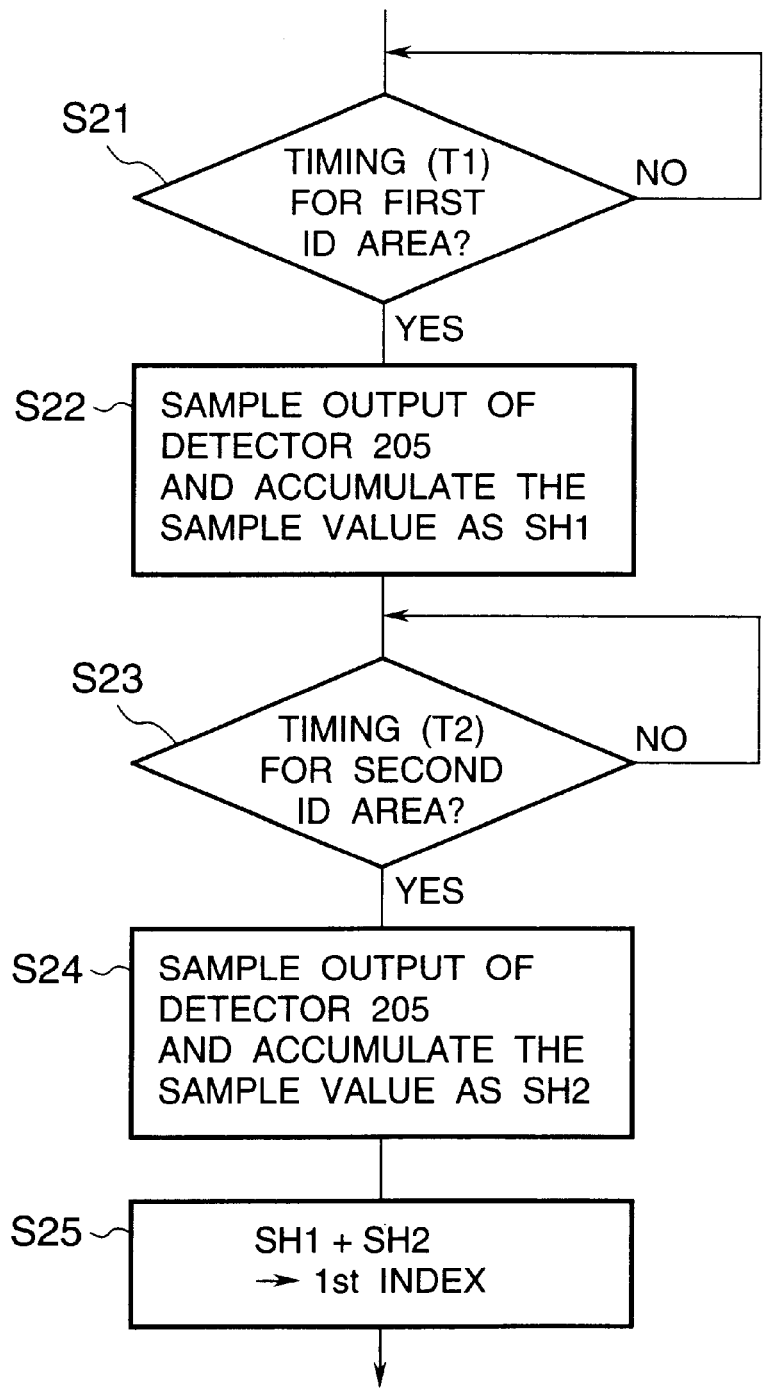
FIG. 5 is flowchart showing the operation for determining the first index in Embodiment 1.

That is, the system controller 101 receives the output of the first envelope/signal amplitude detector 205 in the waveform shaping circuit 100, and converts the received output into digital signals by means of the ADC 101c, and determines the index by performing the operation shown in FIG. 5.

That is, the system controller 101 waits until a timing T1 when information is reproduced from the first identification information area (S21), and samples the output of the first envelope/signal amplitude detector 205, and accumulates this sample value as SH1 into the processor 101a (S21). The system controller 101 then waits until a timing T2 when information is reproduced from the second identification information area (S23), and samples the output of the first envelope/signal amplitude detector 205, and accumulates this sample value as SH2 into the processor 101a (S24). The system controller 101 then determines the sum SHs=SH1+SH2, and set the value of the sum SHs as the first index (S25).

Alternatively, it is possible to provide the first envelope/signal amplitude detector 205 with two sample-hold circuits and an operational amplifier to generate an analog sum signal. In this case, the first index is obtained when the generated sum signal is fed to the ADC 101c or the like in the system controller 101. However, it is necessary to add a signal line for providing the first envelope/signal amplitude detector 205 with a control signal for controlling the sample/hold operation. Still alternatively, the first index can also be determined by performing an operation on the amplitude information supplied to the ADC 101c from the AGC unit 202, since the signal amplitude information can also be obtained from the AGC unit 202 as described above.

Since the signal amplitude information can be obtained, as mentioned above, from the first envelope/signal amplitude detector 205 or the AGC unit 202 already provided in the drive for detecting data from the reproduced signal, no new circuit is necessary and the cost of the drive does not increase. In this way, the index for determining the tilt compensation amount used for making the relative tilt between the optical disk and optical head substantially zero, can be obtained by the first envelope/signal amplitude detector 205 or AGC unit 202, and the system controller 101.

Figure 6A:
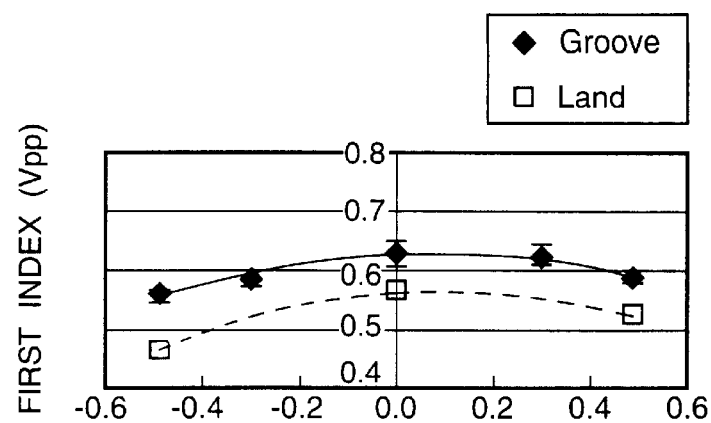
FIG. 6A to FIG. 6D show the relation between each index and tilt amount in each of the embodiments of the invention.
Figure 6B:
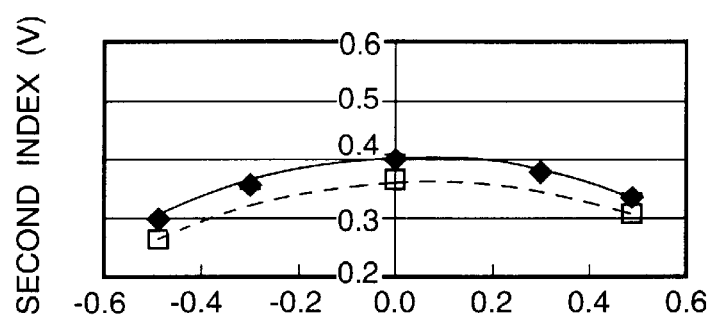

In FIG. 6A, the measured relation between the determined first index and a tilt of the optical head in the radial direction of the optical disk (a radial tilt) is plotted. As the drawing indicates, the tilt between the optical disk and optical head can be approached to zero, if the tilt controller 102 is controlled so that the first index nears the extremum (the peak). This relation may be approximated by a negative quadratic function having a peak at a point at which the radial tilt is substantially zero. In the drawing, the degree of the dependence on the detrack amount is shown by a vertical bar for every measured value. It is found, in the drawing, that the vertical bar are short and the first index varies depending only on the tilt amount, scarcely on the detrack amount. In FIG. 6D, a data-clock jitter, normalized by the period of the reproduced clock, between the reproduced data and reproduced clock which is synchronized with the reproduced data generated at a data PLL, is plotted against the radial tilt. The drawing indicates that the jitter of the reproduced signal varies to be close to the minimum value if the tilt controller is controlled so that the first index approaches an extremum. That is, the first index is effective for the tilt compensation.

In the tilt compensation operation, the magnitude of the first index obtained for every sector and the first index obtained before the former, are compared so that the compensation is performed for every sector. In this case, the first index generated from the signal reproduced from the sector identification information area might be an abnormal value because of a defect in a sector or the like. To eliminate the influence, when the tilt compensation is performed for every sector, a threshold may be set at a predetermined value for the variation width of the first index as a unit for a compensation step, and it may be so controlled that when the variation width of the first index exceeds the threshold value the index is not used for the tilt compensation. Instead of compensating the tilt for every sector, the compensation can be also performed taking a number of sectors as a unit by using the average value of the first index obtained from such number of sectors. In this case, in comparison with the case that the compensation is performed for every sector, there is an advantage that the variation of the first index for every sector can be restrained and a load on the tilt compensation system can be also reduced.

In this way, satisfactory tilt compensation is achieved if the system controller 101 controls the tilt controller 102 in such a way that the tilt compensation amount is set at a value at which the first index is the maximum. The tilt compensation means is formed of the system controller 101 and tilt controller 102. In general, the mechanism for the tilt compensation is mounted on a mechanical base on which an optical head and traverse motor are mounted. Detailed description thereof is omitted.

By selecting a pattern which often occurs continuously, as a reproduced data pattern for obtaining the first index, it is possible to detect the signal amplitude with stability and high accuracy. The best pattern is the VFO (Variable Frequency Oscillator) pattern for data PLL synchronization, which is recorded or pre-formatted before data. The position of the VFO area is usually defined by the sector format, and the signal amplitude can be correctly detected at a certain timing, so that the accuracy and reliability of the tilt compensation are improved.

Figure 16:
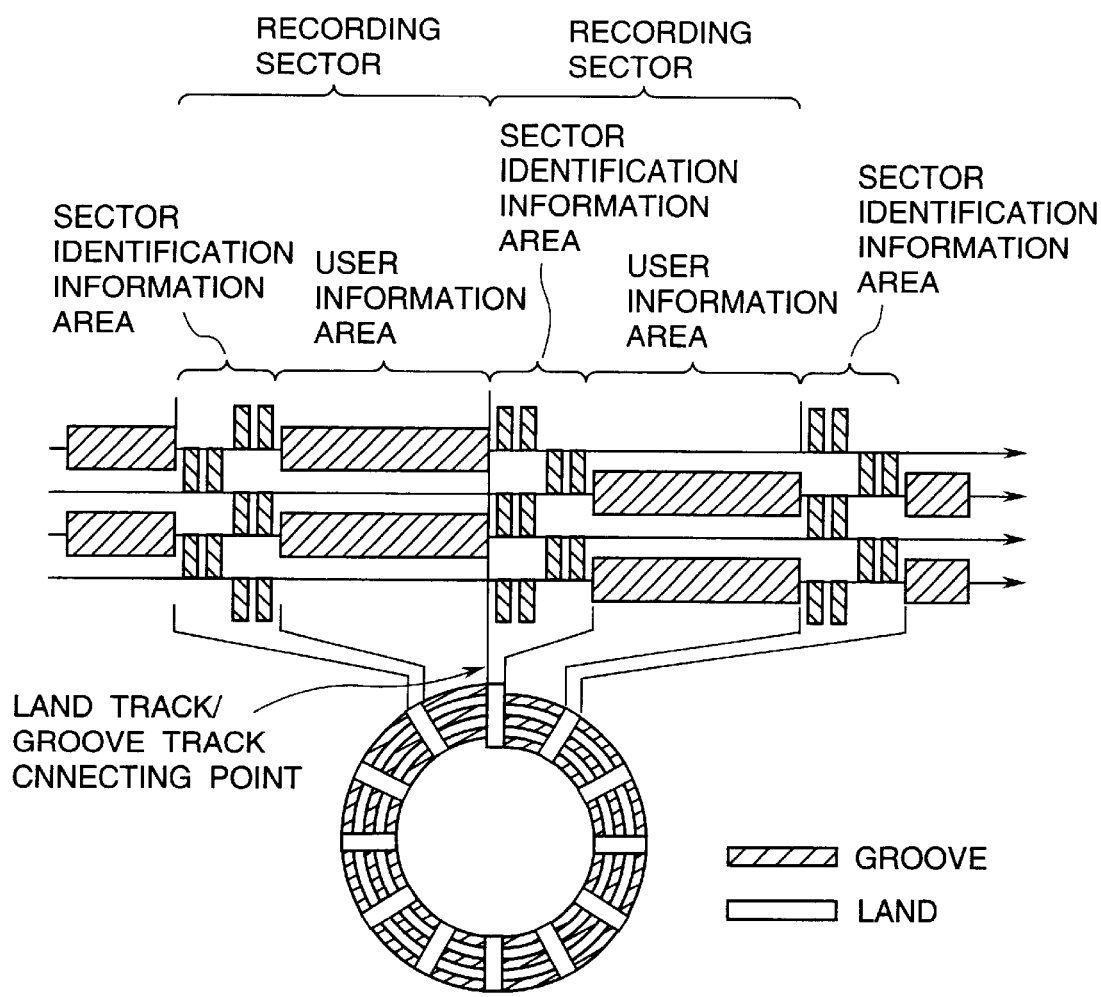
FIG. 16 shows a track layout of a conventional optical disk.

In the case of a disk with a land/groove recording format shown in FIG. 16, the reliability of data detection can be improved by separately setting the tilt compensation for lands and grooves. This can be implemented by storing, in a lookup table, respective optimum parameters for lands and grooves obtained during the compensation operation, and by having the system controller 101 control the drive with reference to the lookup table. Alternatively, if the setting is not changed between the lands and grooves, it may not be possible to set the parameters for the respective optimum values. In this case, the parameters may be set so that the quality of reproduced signals (in a broad sense, including a jitter and error rate of a reproduced data) from lands and grooves is within a permissible range.

Figure 7:
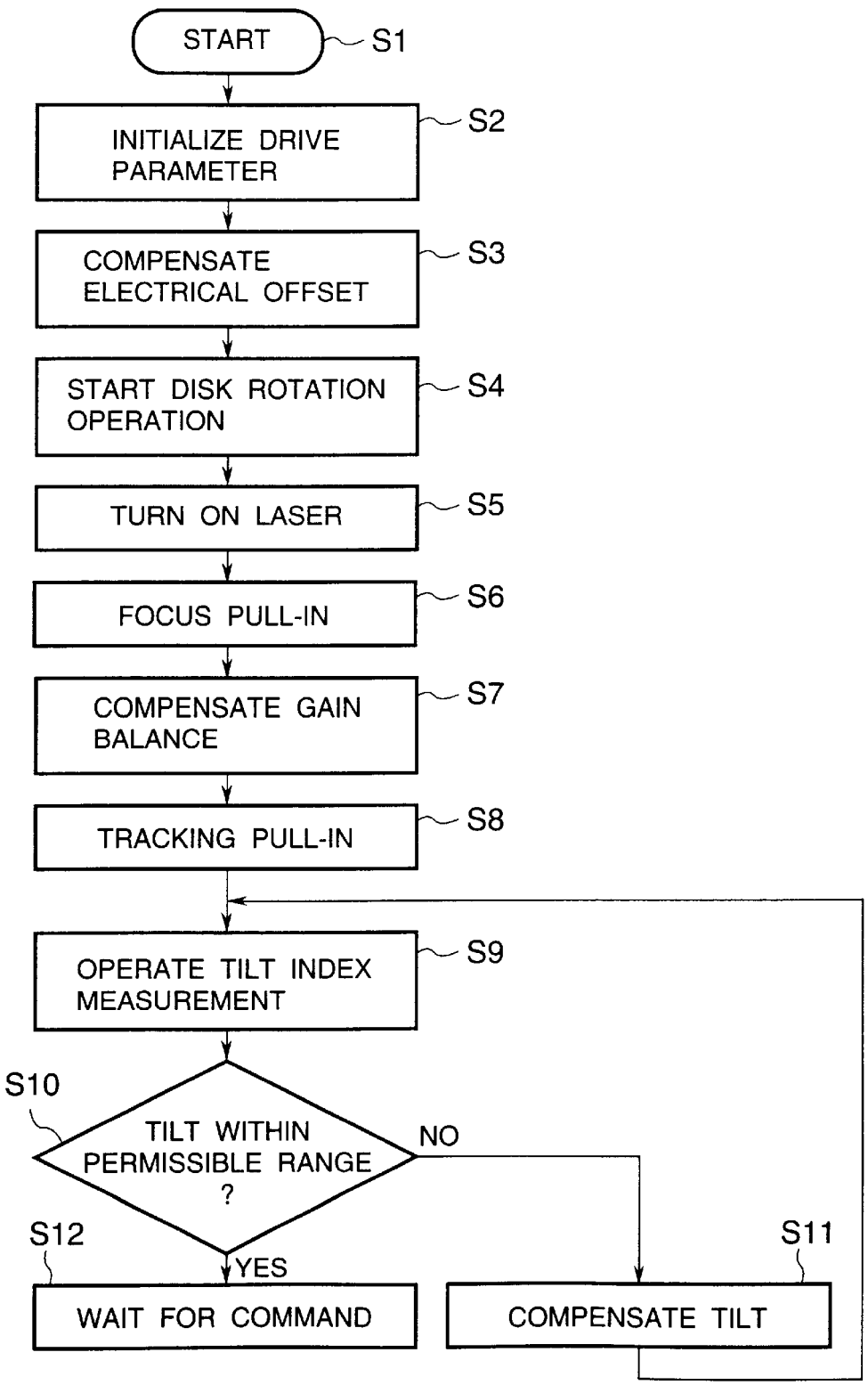
FIG. 7 is a flowchart showing the operation for tilt compensation in Embodiment 1.

Next, a tilt compensation method for the disk drive of the invention will be described with reference to FIG. 7. When power is applied to the drive and the optical disk 10 is set thereto, the drive enters a start state (S1). Then, the system controller 101 initializes parameters for the entire drive (S2). The electrical offset in analog circuits for generating focus error signals and tracking error signals is compensated (S3). Next, the optical disk 10 is rotated (S4), the LD 11 is turned on (S5), and a focus pull-in operation is performed (S6). The gain balance in the optical system and electrical circuit system is compensated (S7), and then a tracking pull-in operation is performed (S8). When the tracking pull-in is achieved and preparation for reproduction is ready, the tilt compensation operation is started.

At first, an index of the tilt, that is the first index here, is measured (S9), and judgment is made as to whether the result of the measurement is within a permissible range (S10). That is, it is judged whether the first index is within the range of the permissible values which includes extremums. If the first index is out of the range, the tilt controller 102 is directed by the system controller 101 and controlled to vary the tilt compensation amount (S11), and then the operations after step S9 is repeated. If the first index is within the range, the operation is terminated and the standby state follows until the next command (S12).

In the embodiment, while the tilt compensation is described, there are, in the disk drive, electrical offsets, imbalance in the optical system, offsets due to the gain imbalance in the detection circuit, and offsets caused by the detrack. The following three steps are used to accurately compensate the offsets mentioned above; firstly, the electrical offsets, imbalance in the optical system, and offsets caused by the gain imbalance in the detection circuit are compensated. Secondly, the tilt is compensated according to the variable index which depends only on the tilt amount, and does not depend on the detrack amount. Lastly, the detrack is compensated.

Embodiment 2

Figure 8:
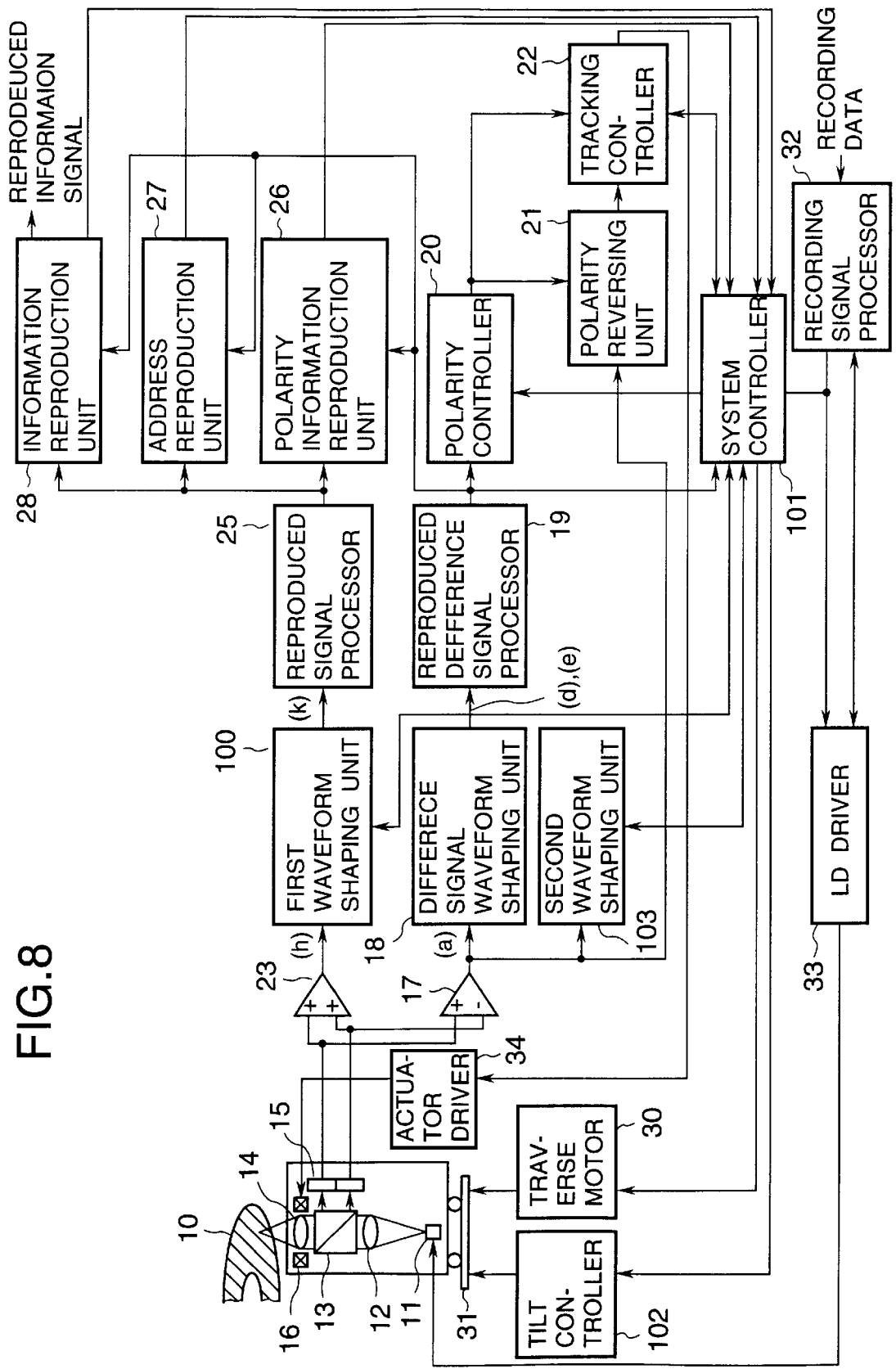
FIG. 8 is a block diagram showing a disk drive of Embodiment 2 of the invention.

FIG. 8 is a diagram showing a disk drive of Embodiment 2 of the invention. In the drawing, reference numeral 10 denotes an optical disk, 11 denotes a semiconductor laser (LD) serving as a light source, 12 denotes a collimate lens, 13 denotes a beam splitter, 14 denotes an objective lens, 15 denotes a photodetector, 16 denotes an actuator, 17 denotes a differential amplifier, 18 denotes a difference signal waveform shaping unit, 19 denotes a reproduced difference signal processor, 20 denotes a polarity controller, 21 denotes a polarity reversing unit, 22 denotes a tracking controller, 23 denotes a summing amplifier, 25 denotes a reproduced signal processor, 26 denotes a polarity information reproduction unit, 27 denotes an address reproduction unit, 28 denotes an information reproduction unit, 30 denotes a traverse controller, 31 denotes a traverse motor, 32 denotes a recording signal processor, 33 denotes a laser (LD) driver, and 34 denotes an actuator driver. Their functions are the same as or equivalent to those described in connection with the prior art example or Embodiment 1. The semiconductor laser 11, the collimate lens 12, the beam splitter 13, the objective lens 14, the photodetector 15 and the actuator 16 in combination constitute an optical head, which is attached to a head base.

Figure 9:
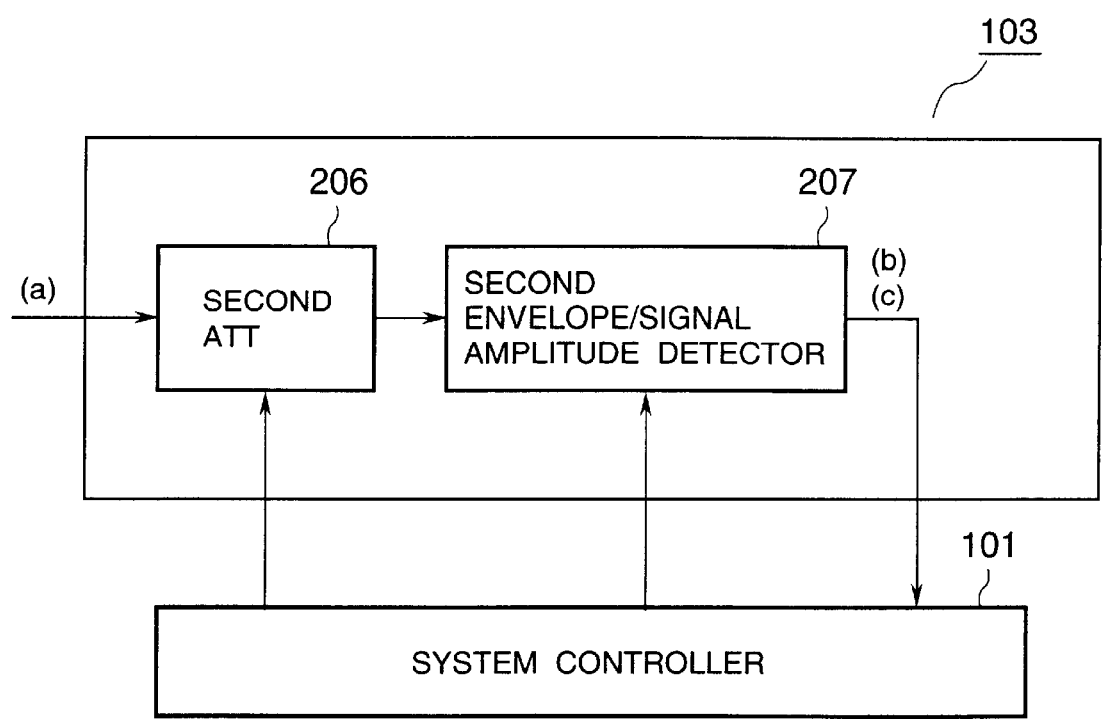
FIG. 9 is a block diagram showing a second waveform shaping unit which constitutes the disk drive of Embodiment 2.

Additionally, 100 denotes a first waveform shaping unit, 101 denotes a system controller, and 102 denotes a tilt controller. The blocks mentioned above are identical with the blocks of FIG. 1 explained in connection with Embodiment 1, and their operations are also basically identical. A block that is not shown in FIG. 1 is a second waveform shaping unit 103, the details of which are shown in FIG. 9. In the drawing, reference numeral 206 denotes a second ATT (attenuator), and 207 denotes a second envelope/signal amplitude detector only such input and output signals from the system controller 101 that are concerned with the second ATT 206 and second envelope/signal amplitude detector 207 are illustrated.

The operations will next be described. The description, however, is limited to the difference from those of Embodiment 1.

Figure 10:
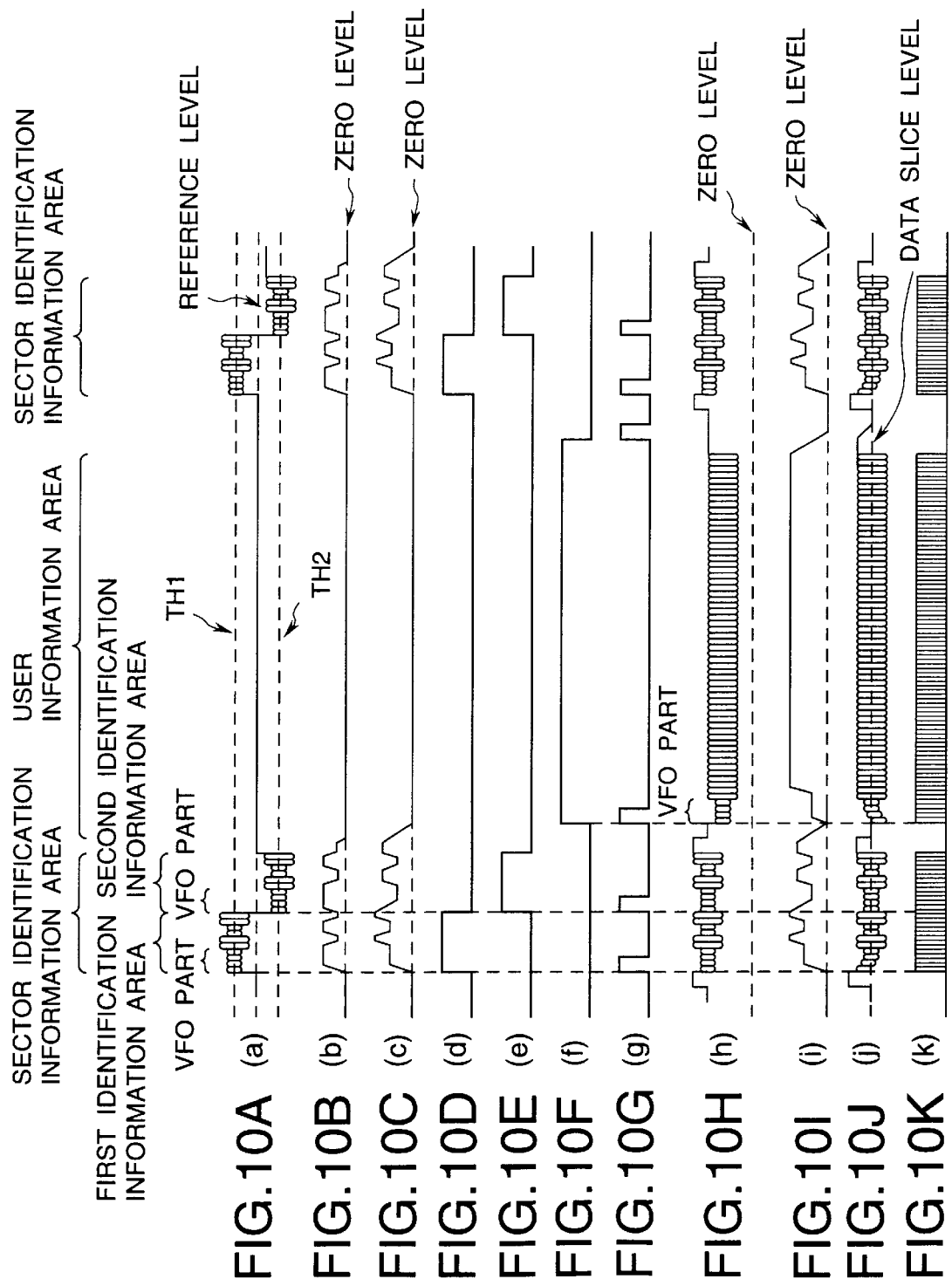
FIG. 10A to FIG. 10K show waveforms output from blocks which form the disk drive of Embodiment 2.

In the present embodiment, an index for the tilt compensation is obtained from a push-pull signal, shown as (a) in FIG. 10A, output from the differential amplifier 17. More particularly, the sum of the amplitude of a signal output from the differential amplifier 17 obtained during reproduction of the first identification information area which forms the sector identification information area, and the amplitude of a signal output from the differential amplifier 17 obtained during reproduction of the second identification information area which also forms the sector identification information area, is used as the index (hereinafter referred to as a second index). The rest of the operations are similar to those in Embodiment 1.

Detection of the second index is started when the system controller 101 controls the second ATT 206 to adjust the level of the output of the ATT 206 so that the amplitude of the signal can be detected with a high accuracy at the second envelope/signal amplitude detector 207. The system controller 101 determines the second index by performing operations on signal amplitude information acquired during reproduction of the first and second identification information areas, using the ADC 101c provided in the system controller, according to the signal amplitude detection waveform, shown as (c) in FIG. 10C, output from the second envelope/signal amplitude detector 207.

Figure 11:
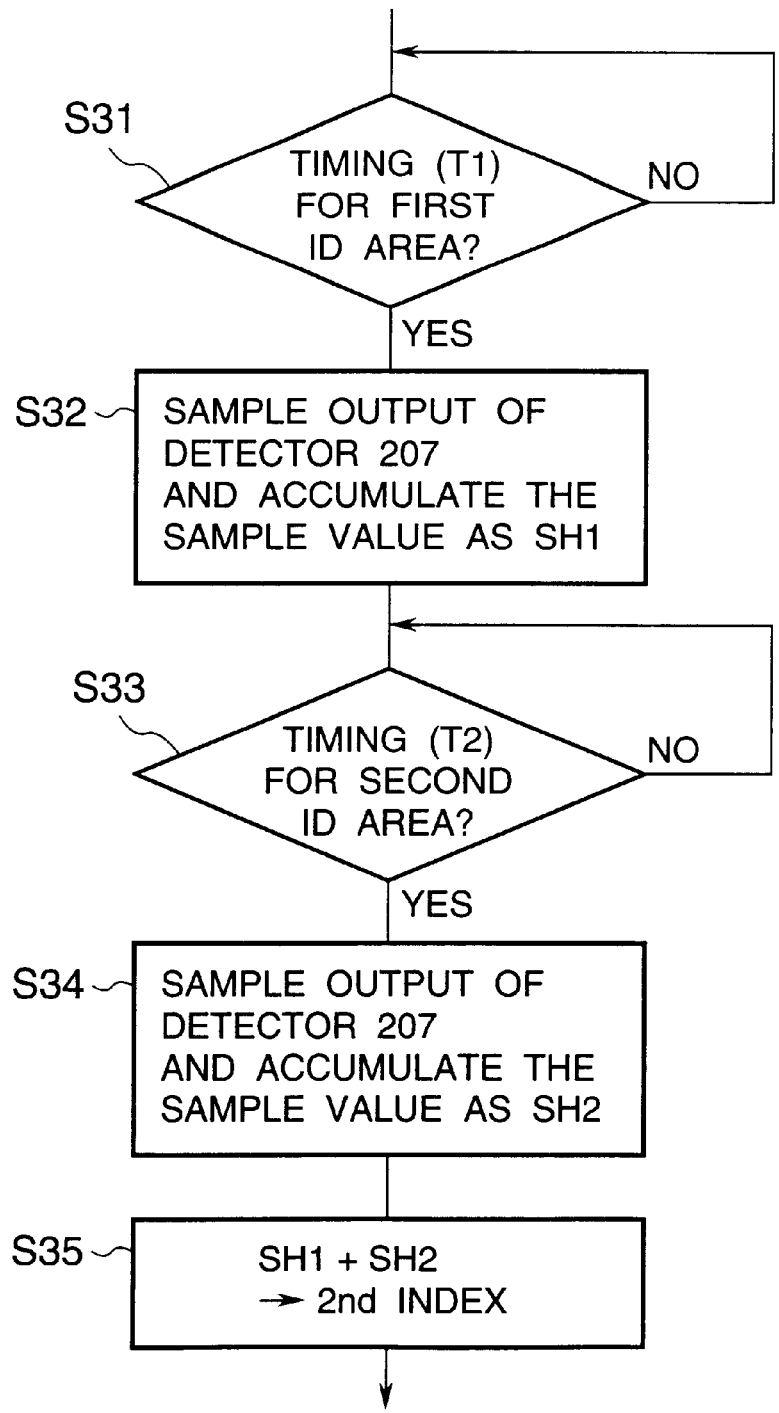
FIG. 11 is flowchart showing the operation for determining the second index in Embodiment 2.

That is, the system controller 101 receives the output of the second envelope/signal amplitude detector 207, and converts the received output into digital signals by means of the ADC 101c, and determines the index by performing the operation shown in FIG. 11. That is, the system controller 101 waits until a timing T1 when information is reproduced from the first identification information area (S31), and samples the output (c) of the second envelope/signal amplitude detector 207, and accumulates this sample value as SH1 into the processor 101a (S32). The system controller 101 then waits until a timing T2 when information is reproduced from the second identification information area (S33), and samples the output (c) of the second envelope/signal amplitude detector 207, and accumulates this sample value as SH2 into the processor 101a (S34). The system controller 101 then determines the sum SHs=SH1+SH2, and set the value of the sum SHs as the second index (S35).

As an alternative, it is possible to provide two sample-hold circuits and an operational amplifier in the second envelope/signal amplitude detector 207 to generate an analog sum signal. In this case, just by taking the generated sum signal using the ADC 101c or the like, the system controller 101 can obtain the second index, without performing any operations. However, it is necessary to add a signal line for providing the second envelope/signal amplitude detector 207 with a control signal for controlling the sample/hold operation. The second index varies depending only on the tilt amount, not on the detrack amount, as does the first index. In FIG. 6B, the measured relation between the determined second index and a radial tilt is plotted. As the drawing indicates, the relative tilt between the optical disk and optical head can be approached to zero, if the tilt controller 102 is controlled so that the second index approaches the maximum (peak). The relation may be approximated by a negative quadratic function having a peak at a point at which the radial tilt is substantially zero.

In the drawing, the degree of the dependence on the detrack amount is shown by a vertical bar for every measured value. It is found, in the drawing, that the vertical bars are short and the second index varies depending only on the tilt amount, scarcely on the detrack amount. Moreover, as shown in FIG. 6D, a data-clock jitter between the reproduced signal and reproduced clock varies to be close to the minimum value, if the tilt controller is controlled so that the second index approaches an extremum. That is, the second index is effective for the tilt compensation. In this way, concerning the tilt compensation in the present embodiment, it is satisfactory if the system controller 101 controls the tilt controller 102 in such a way that the tilt compensation amount is set at a value at which the second index is the maximum. The method of the tilt compensation is similar to the method described in connection with Embodiment 1.

By selecting a pattern which often occurs continuously, as a reproduced data pattern for detecting the signal amplitude, it is possible to detect the signal amplitude with stability and high accuracy. The best pattern is the VFO pattern for data PLL synchronization, which is recorded or pre-formatted before data, as was also explained in connection with Embodiment 1.

The index obtained from the push-pull signal, which is an output from the differential amplifier 17 shown as (a) in FIG. 10A can be alternatively derived from the absolute value ((b) in FIG. 10B) of the difference between the envelope of the push-pull signal and a reference level. In FIG. 10B, the signal level outside of the sector identification information areas is shown to be zero. But it is not necessarily so. When the output of the differential amplifier 17 outside of the sector identification information areas is different from the reference level, due to detrack, electrical offset, or the like, the signal level of the signal (b) shown in FIG. 10B will not be zero. The index for tilt compensation may be the sum of the absolute value ((b) at FIG. 10B) of the difference between the envelope of the push-pull signal, which is an output from the differential amplifier 17, obtained during reproduction of the first identification information area, and the reference level, and the absolute value ((b) at FIG. 10B) of the difference between the envelope of the push-pull signal obtained during reproduction of the second identification information area, and the reference level (this index is called a third index).

In other words, the absolute value of the difference between the envelope of the push-pull signal, which is an output from the differential amplifier 17, obtained during reproduction of the first identification signal area, and the envelope of the push-pull signal obtained during reproduction of the second identification signal area may be determined. The third index may alternatively be the difference between the envelope of the push-pull signal, which is an output of the differential amplifier 17, obtained during reproduction of the first identification information area, and the envelope of the push-pull signal obtained during reproduction of the second identification information area. However, it is necessary to note that the polarity of the third index is different between the land part and the groove part.

In the above description, it is assumed that the envelope on the side near the reference level (that is, the level obtained during reproduction of the space part between pit parts) is detected. As an alternative, the envelope on the side farther away from the reference level (that is, the level obtained during reproduction of the pit part) may be detected. The reference level may be the DC level of the output signal of thee differential amplifier 17 obtained when the light beam is scanning the center of the track, outside of the sector identification information areas.

Figure 12:
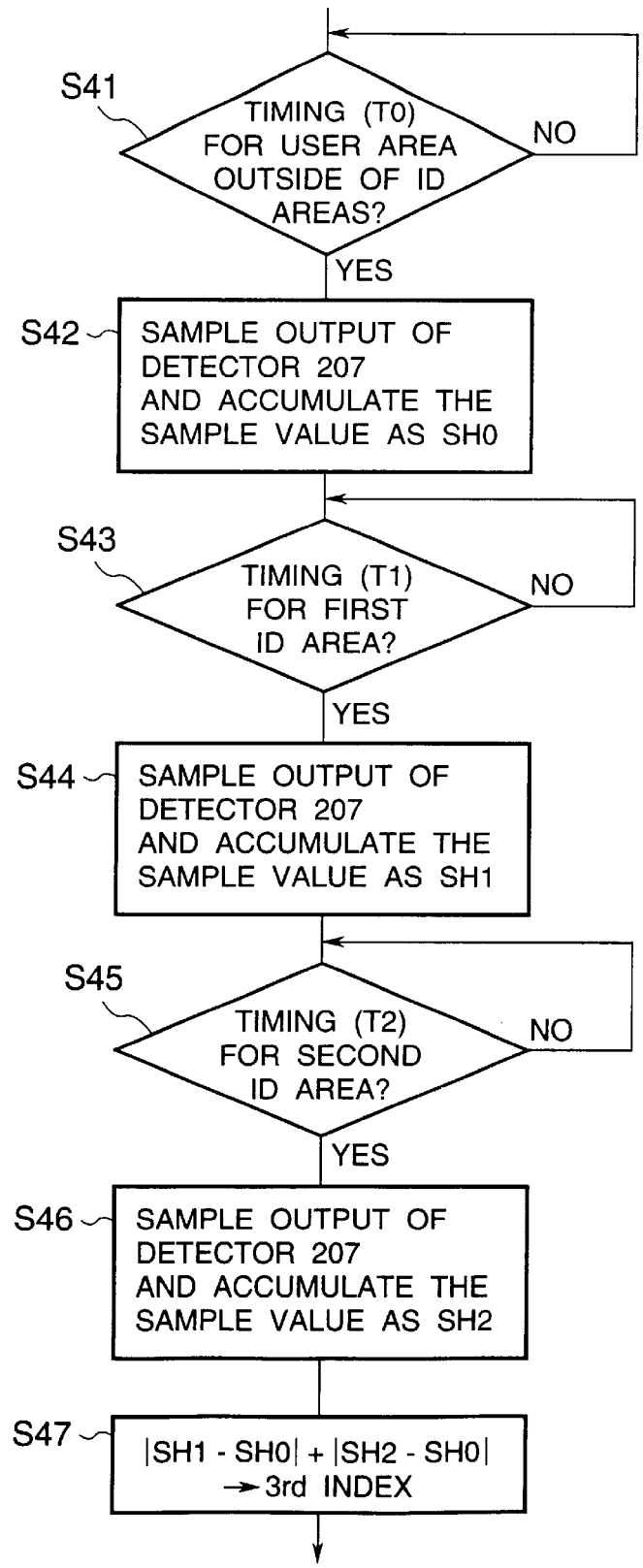
FIG. 12 is a flowchart showing the operation for determining the third index in a variation of Embodiment 2.

The sequence for determining the third index is shown in FIG. 12. First, the system controller 101 waits until a timing T0 when information is reproduced from an area outside of the sector identification information areas (S41), and samples the output (b) of the second envelope/signal amplitude detector 207, and accumulates this sample value as SH0 (S42). The system controller 101 then waits until a timing T1 when information is reproduced from the first identification information area (S43), and samples the output (b) of the second envelope/signal amplitude detector 207, and accumulates this sample value as SH1 (S44). The system controller 101 then waits until a timing T2 when information is reproduced from the second identification information area (S45), and samples the output (b) of the second envelope/signal amplitude detector 207, and accumulates this sample value as SH2 (S46). The system controller 101 then determines the sum $$SHs=|SH1-SH0|+|SH2-SH0|,$$

and set the value of the sum SHs as the third index (S47).

Figure 13:
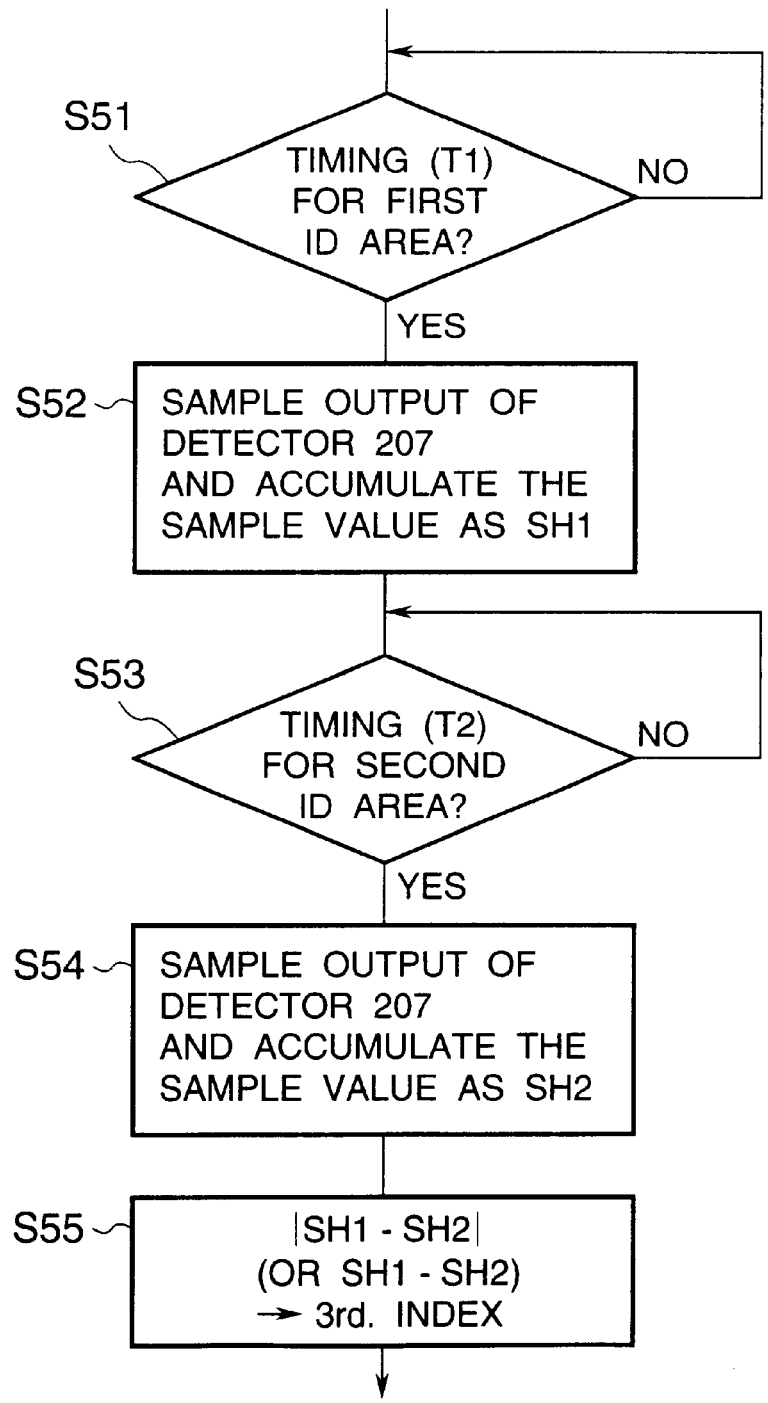
FIG. 13 is flowchart showing another method for determining the third index in the variation of Embodiment 2.

A further alternative sequence for determining the third index is shown in FIG. 13. That is, the system controller 101 then waits until a timing T1 when information is reproduced from the first identification information area (S51), and samples the output (b) of the second envelope/signal amplitude detector 207, and accumulates this sample value as SH1 (S52). The system controller 101 then waits until a timing T2 when information is reproduced from the second identification information area (S53), and samples the output (b) of the second envelope/signal amplitude detector 207, and accumulates this sample value as SH2 (S54). The system controller 101 then determines the difference $$SHs=|SH1-SH2|,$$

and set the value of the difference SHs as the third index (S55). Alternatively, the difference $$SHs=SH1-SH2$$

may be determined and used as the third index.

Figure 6C:
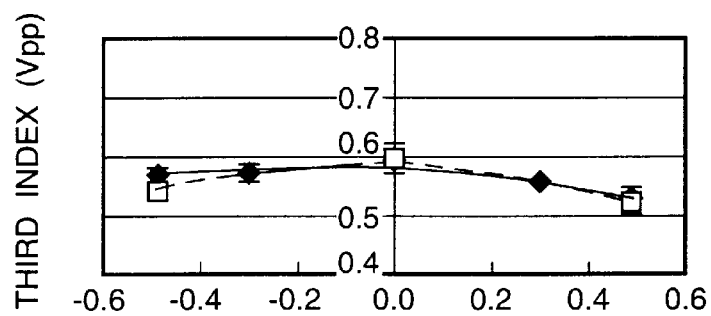
Figure 6D:
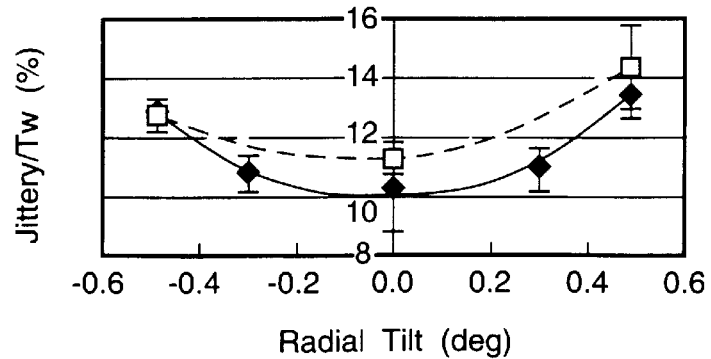

In FIG. 6C, the measured relation between the determined third index and a radial tilt is plotted. As the drawing indicates, the relative tilt between the optical disk and optical head can be approached to zero, if the tilt controller 102 is controlled so that the third index approaches the maximum (peak). The relation may be approximated by a negative quadratic function having a peak at a point at which the radial tilt is substantially zero. In the drawing, the degree of the dependence on the detrack amount is shown by a vertical bar for every measured value. It is found, in the drawing, that the vertical bars are short and the third index varies depending only on the tilt amount, scarcely on the detrack amount. Moreover, as shown in FIG. 6D, a data-clock jitter between a reproduced signal and reproduced clock varies to be close to the minimum value, if the tilt controller is controlled so that the third index approaches an extremum. That is, the third index is effective for the tilt compensation. Thus, in the tilt compensation in the present embodiment, it is satisfactory if the system controller 101 controls the tilt controller 102 in such a way that the tilt compensation amount is set at a value at which the third index is the maximum. The method of the tilt compensation for this case is similar to the method described in connection with Embodiment 1.

By selecting a pattern which often occurs continuously, as a reproduced data pattern for detecting the envelope, it is possible to detect the envelope of the reproduced signal with stability and high accuracy. The best pattern is the VFO (Variable Frequency Oscillator) pattern for data PLL synchronization, which is recorded or pre-formatted before data, as in the above description.

In the present example, the second ATT 206 and second envelope/signal amplitude detector 207 need to be added for the detection of the signal amplitude information or envelope. However, the first ATT 200 and first envelope/signal amplitude detector 205 which are already provided in the drive for detecting data from reproduced signals may be the same as them. Consequently, no designing of new circuits is necessary and the cost of the drive scarcely increases.

As has been described, the index for setting the tilt compensation amount can be determined by the second envelope/signal amplitude detector 207 and the system controller 101. A tilt compensation means can be formed of the system controller 101 and tilt controller 102.

Embodiment 3

Figure 14:
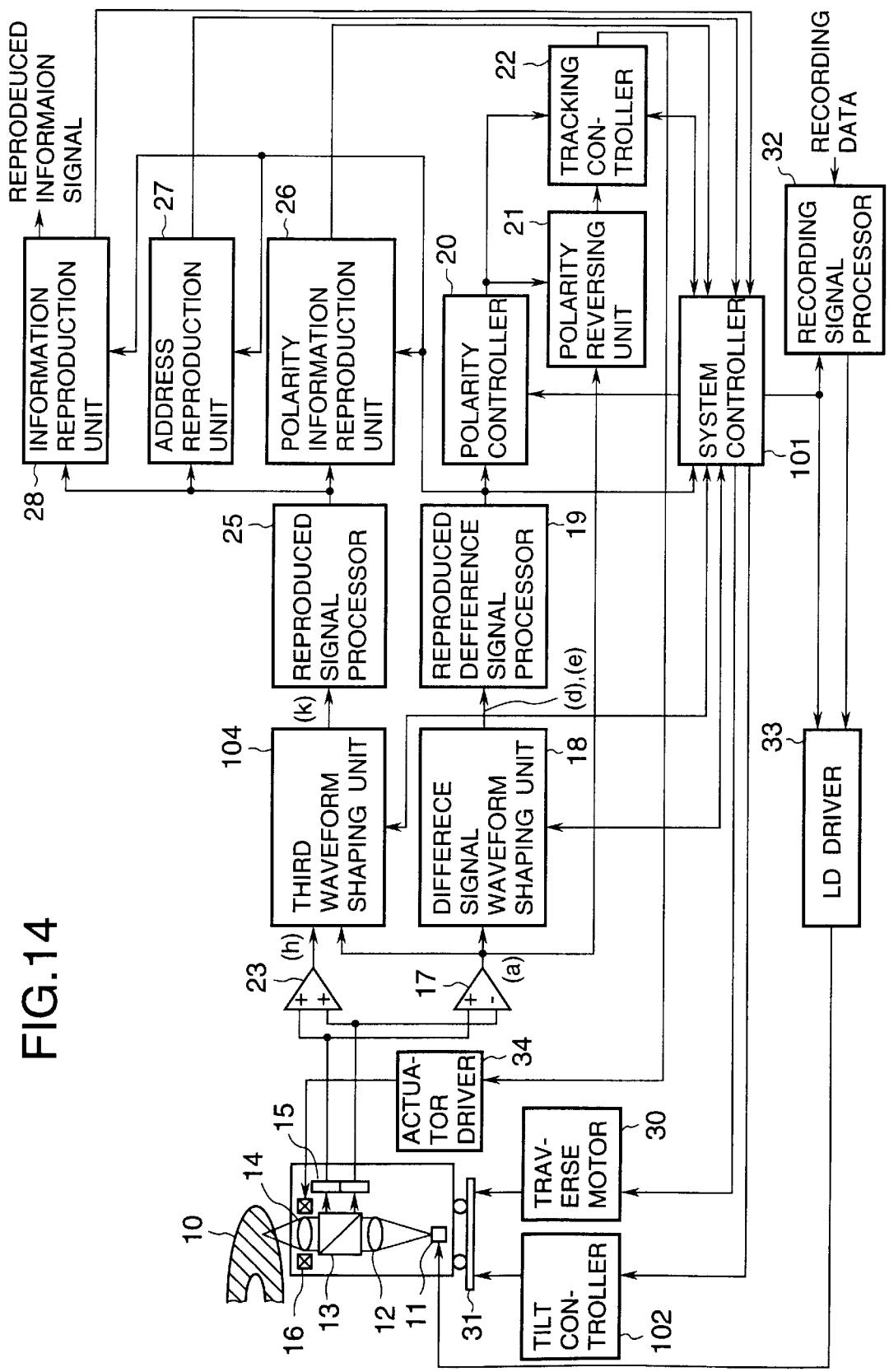
FIG. 14 is a block diagram showing a disk drive of Embodiment 3 of the invention.

FIG. 14 is a diagram showing a disk drive of Embodiment 3 of the invention. In the drawing, reference numeral 10 denotes an optical disk, 11 denotes a semiconductor laser (LD) serving as a light source, 12 denotes a collimate lens, 13 denotes a beam splitter, 14 denotes an objective lens, 15 denotes a photodetector, 16 denotes an actuator, 17 denotes a differential amplifier, 18 denotes a difference signal waveform shaping unit, 19 denotes a reproduced difference signal processor, 20 denotes a polarity controller, 21 denotes a polarity reversing unit, 22 denotes a tracking controller, 23 denotes a summing amplifier, 25 denotes a reproduced signal processor, 26 denotes a polarity information reproduction unit, 27 denotes an address reproduction unit, 28 denotes an information reproduction unit, 30 denotes a traverse controller, 31 denotes a traverse motor, 32 denotes a recording signal processor, 33 denotes a laser (LD) driver, and 34 denotes an actuator driver. Their operations are the same as or equivalent to those in the description of the prior art. The semiconductor laser 11, the collimate lens 12, the beam splitter 13, the objective lens 14, the photodetector 15 and the actuator 16 in combination constitute an optical head, which is attached to a head base.

Additionally, 101 denotes a system controller, and 102 denotes a tilt controller. The blocks mentioned above are identical with those of FIG. 1 described in connection with Embodiment 1. The operations of them are also identical.

Figure 15:
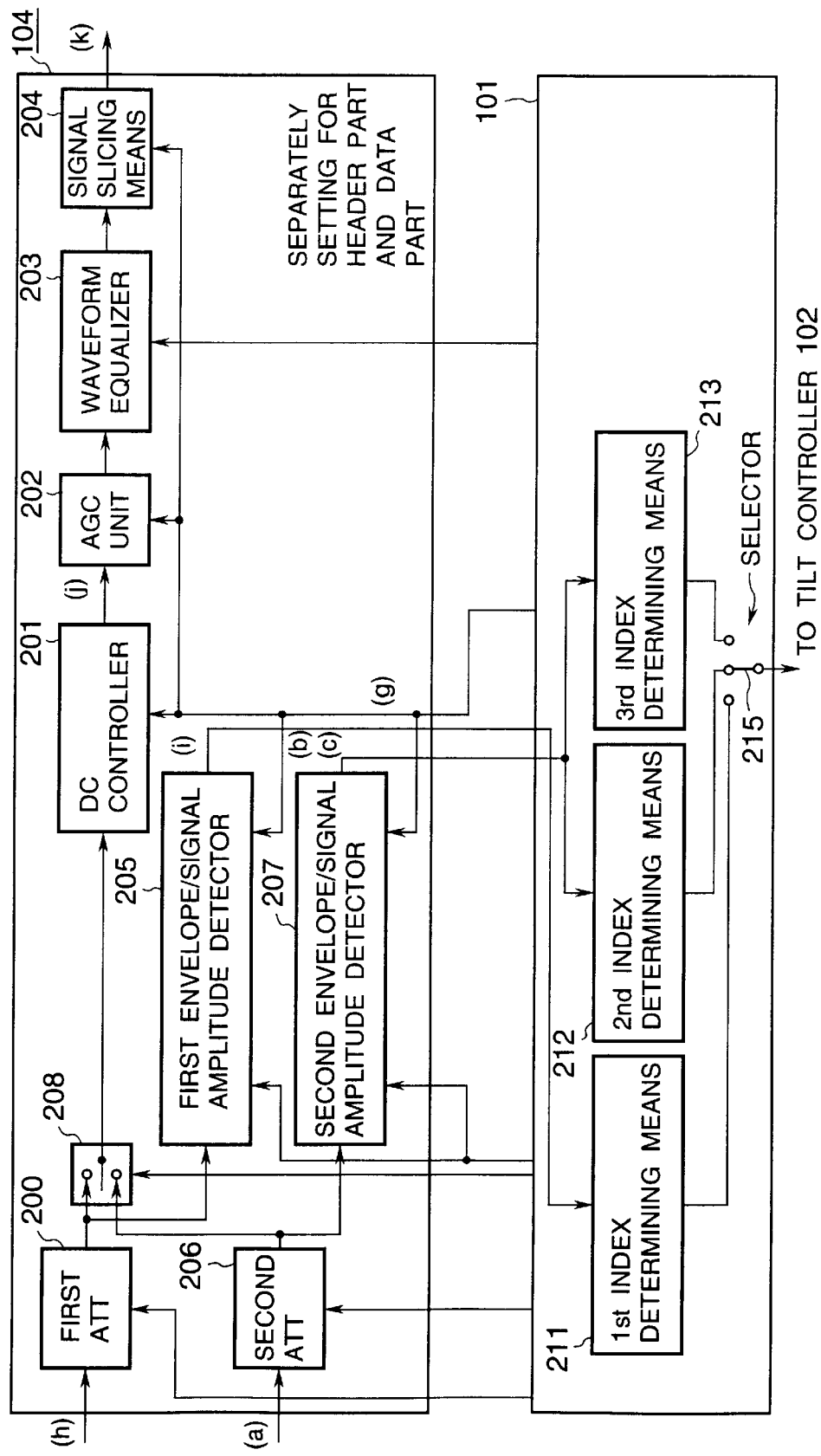
FIG. 15 is a block diagram showing a third waveform shaping unit which constitutes the disk drive of Embodiment 3.

FIG. 15 is a block diagram of the details of a third waveform shaping unit 104 which is the block not shown in FIG. 1, as well as details of the system controller 101 used in this embodiment. In the drawing, reference numeral 200 denotes a first ATT, 201 denotes a DC controller, 202 denotes an AGC unit, 203 denotes a waveform equalizer, 204 denotes a signal slicing means, 205 denotes a first envelope/signal amplitude detector, 206 denotes a second ATT, 207 denotes a second envelope/signal amplitude detector, and 208 denotes a signal selecting means, which selects either the output of the first ATT 200 or the output of the second ATT 206, and supplies the selected output to the DC controller 201. The blocks of reference numerals 200 to 204 are identical to those of FIG. 4 described in connection with Embodiment 1. The blocks of reference numeral 206 to 207 are identical to those of FIG. 9 described in connection with Embodiment 2. Their operations are also basically identical.

The system controller 101 includes a first index determining means 211, a second index determining means 212, and a third index determining means 213. Their functions are identical to those described with reference to FIG. 5, FIG. 11, FIG. 12, and FIG. 13, and are realized by the processor 101a operating in accordance with the programs stored in the program memory 101b. For this purpose, the first index determining means 211 is connected to receive the output (i) of the first envelope/signal amplitude detector 205, as is the system controller 101 of FIG. 4 which operates as shown in FIG. 5. The second index determining means 212 is connected to receive the output (c) of the second envelope/signal amplitude detector 207, as is the system controller 101 of FIG. 9 which operates as shown in FIG. 11. The third index determining means 213 is connected to receive the output (b) of the second envelope/signal amplitude detector 207, as is the system controller 101 of FIG. 9 which operates as shown in FIG. 12 or FIG. 13.

A selector 215 selects one of the first to third indexes output from the first to third index determining means 211 to 214. The selection is made in such a way as to improve the reliability of the tilt compensation.

That is, the selector 215 selects the index which enables the tile compensation to be most accurate among the first to third indexes. For this purpose, the system controller 101 determines, before actual reproduction of data from an optical disk, the index by which a signal with the best reproduction quality can be obtained, with respect to a data jitter, address detection error rate and the like in the sector identification information area which are supplied from the address reproduction unit 27. In this case, the address reproduction unit 27 needs to have an error detecting function.

The invention with the configuration described above has the following effects.

The disk drive of the invention does not need an additional system for the tilt compensation, since the drive controls, by using, as an index, a signal determined by an output signal from the photodetector obtained when the light spot traces the first identification information area and an output signal obtained when the light spot traces the second identification information area, the relative tilt between the disk and the head so as to cause the index to approach an extreme value. Consequently, increase of the cost of the drive can be reduced.

According to the invention, the indexes for the tilt compensation are scarcely influenced by the detrack compensation. Therefore, even if the tilt compensation and detrack compensation is performed together, only the tilt can be easily compensated without regarding the detrack compensation.

What is claimed is:

1. A disk drive for compensating a relative tilt between a disk including a first identification information area shifted radially outward by a predetermined distance from the center of a track, and a second identification information area shifted radially inward by the same distance, and a head for forming a light spot on the disk, comprising:

a light processing unit for receiving light reflected at the light spot and outputting an output signal;

a detector for detecting first information based on the output signal obtained when the light spot traces said first identification information area, and second information based on the output signal obtained when the light spot traces said second identification information area;

an index determiner for determining an index based on a sum of values of the first information and the second information; and a tilt controller for controlling the relative tilt such that the index approaches an extreme value.

2. The disk drive according to claim 1, wherein the first information is a first envelope signal obtained based on the output signal and the second information is a second envelope signal obtained based on the output signal.

3. The disk drive according to claim 1, further comprising:

a hold circuit for holding one of the first information and the second information until the other of the first information and the second information is obtained, wherein the sum is obtained by tracing said first identification information area to detect the first information, and tracing said second identification information area to detect the second information, and combining the held one of the first information and the second information with the other of the first information and the second information.

4. The disk drive according to claim 1, wherein said light processing unit includes
a photodetector having two light detecting parts producing electrical signals corresponding to the light detected by the respective light detecting parts; and
at least one of:
a summing amplifier for producing a sum signal representing a sum of the electrical signals, and
a differential amplifier for producing a difference signal representing a difference between the electrical signals.

5. The disk drive according to claim 4, wherein the first information is a first amplitude of the produced sum signal and the second information is a second amplitude of the produced sum signal obtained based on the output signal.

6. The disk drive according to claim 4, wherein the first information is a first signal amplitude of one of the produced sum signal and difference signal and the second information is a second signal amplitude of said one of the produced sum signal and difference signal of the output signal.

7. The disk drive according to claim 4, wherein the first information corresponds to a first envelope of one of the produced sum signal and difference signal, and the second information corresponds to a second envelope of said one of the produced sum signal and difference signal.

8. The disk drive according to claim 7, wherein each of the first and second information is a difference between an envelope of said one of the produced sum signal and difference signal and a reference level.

9. The disk drive according to claim 7, wherein each of the first and second information is an absolute value of a calculated difference between an envelope of said one of the produced sum signal and difference signal and a reference level.

10. A disk drive for compensating a relative tilt between a disk including a first identification information area shifted radially outward by a predetermined distance from the center of a track, and a second identification information area shifted radially inward by the same distance, and a head for forming a light spot on the disk, comprising:
a light processing unit for receiving light reflected at the light spot and outputting an output signal;
a detector for detecting first information based on the output signal obtained when the light spot traces said first identification information area, and second information based on the output signal obtained when the light spot traces said second identification information area;
an index determiner for determining an index based on a difference between the first information and the second information; and
a tilt controller for controlling the relative tilt such that the index approaches an extreme value.

11. The disk drive according to claim 10 wherein the first information is first signal amplitude information based on the output signal and the second information is second signal amplitude information based on the output signal.

12. The disk drive according to claim 10, wherein the first information is a first envelope signal obtained based on the output signal and the second information is a second envelope signal obtained based on the output signal.

13. The disk drive according to claim 10, further comprising:
a hold circuit for holding one of the first information and the second information while the other of the first information and the second information is obtained,
wherein the difference is obtained by tracing said first identification information area to detect the first information, and tracing said second identification information area to detect the second information, and subtracting the held one of the first information and the second information from the other of the first information and the second information.

14. The disk drive according to claim 10, wherein said light processing unit includes
a photodetector having two light detecting parts producing electrical signals corresponding to the light detected by the respective light detecting parts; and
at least one of:
a summing amplifier for producing a sum signal representing a sum of the electrical signals, and
a differential amplifier for producing a difference signal representing a difference between the electrical signals.

15. The disk drive according to claim 14, wherein the first information is a first envelope of one of the produced sum signal and difference signal, and the second information is a second envelope of said one of the produced sum signal and difference signal.

16. The disk drive according to claim 10, wherein said index determiner determines the index based on an absolute value of a calculated value representing said difference.

17. A method in a disk drive to compensate for a relative tilt between a disk including a first identification information area shifted radially outward by a predetermined distance from the center of a track, and a second identification information area shifted radially inward by the same distance, and a head for forming a light spot on the disk, comprising:
receiving light reflected at the light spot and outputting an output signal;
detecting first information based on the output signal obtained when the light spot traces said first identification information area, and second information based on the output signal obtained when the light spot traces said second identification information area;
determining an index based on one of: a sum of the values of the first and second information, and a difference between the values of the first and second information;
controlling the relative tilt such that the index approaches an extreme value.

18. The method according to claim 17, wherein the detecting step detects the first and second information based on an amplitude of the output signal.

19. The method according to claim 17, further comprising:
holding one of the first information and the second information until the other of the first information and the second information is detected,
wherein the index is determined based on the values of the first information and the second information.

20. The method according to claim 17, wherein the detecting step includes
producing two electrical signals corresponding to the reflected light;
producing at least one of a sum signal of the two electrical signals and a difference signal of the two electrical signals; and
obtaining the first and second information based on one of the produced sum signal and difference signal.

21. The method according to claim 17, wherein the detecting step detects the first and second information by detecting an envelope signal based on the output signal.

* * * * *